United States Patent
Shimomura

(10) Patent No.: US 7,548,252 B2
(45) Date of Patent: Jun. 16, 2009

(54) OPTICAL SCANNING APPARATUS AND COLOR IMAGE FORMING APPARATUS USING THE SAME

(75) Inventor: Hidekazu Shimomura, Yokohama (JP)

(73) Assignee: Canon Kabushiki Kaisha (JP)

( * ) Notice: Subject to any disclaimer, the term of this patent is extended or adjusted under 35 U.S.C. 154(b) by 363 days.

(21) Appl. No.: 11/673,019

(22) Filed: Feb. 9, 2007

(65) Prior Publication Data

US 2007/0188588 A1    Aug. 16, 2007

(30) Foreign Application Priority Data

Feb. 16, 2006    (JP)    .............................. 2006-039457

(51) Int. Cl.
B41J 2/447    (2006.01)

(52) U.S. Cl. ...................................... 347/243

(58) Field of Classification Search ................. 347/233, 347/243
See application file for complete search history.

(56) References Cited

U.S. PATENT DOCUMENTS

| | | | |
|---|---|---|---|
| 5,206,686 | A | 4/1993 | Fukui et al. |
| 6,268,877 | B1 * | 7/2001 | Sato et al. .................. 347/241 |
| 2004/0036936 | A1 | 2/2004 | Nakajima et al. |
| 2004/0070661 | A1 | 4/2004 | Maeda |

FOREIGN PATENT DOCUMENTS

| | | |
|---|---|---|
| EP | 0 843 192 A1 | 5/1998 |
| JP | 2003-182139 | 7/2003 |

OTHER PUBLICATIONS

European Patent Office Communication dated Aug. 28, 2008 concerning Appln 07250581.1 including Search Report issued Aug. 20, 2008.
Chinese Office Action dated Sep. 26, 2008, received in corresponding Chinese Patent Application No. 2007100789402 with English translation.

* cited by examiner

*Primary Examiner*—Huan H Tran
(74) *Attorney, Agent, or Firm*—Rossi, Kimms & McDowell, LLP

(57) ABSTRACT

An optical scanning apparatus and a color image forming apparatus using the same, in which streak-shaped density unevenness is reduced to prevent image deterioration: each of scanning surfaces is simultaneously scanned with light beams emitted from light source units and scanning lines are simultaneously drawn on the scanning surfaces; the light beams emitted from at least four light emitting portions of the corresponding light source unit are simultaneously deflected for scanning by a deflecting unit; and image data corresponding to a first scanning line, i.e. a scanning line located on an uppermost stream side in a direction in which the scanning surfaces move among scanning lines, on at least one of the scanning surfaces in a k-th scanning by the deflecting unit is displaced by at least one line space from image data corresponding to a first scanning line on another scanning surface in the k-th scanning.

12 Claims, 19 Drawing Sheets

TWO-DIMENSIONAL ARRANGEMENT VCSEL

FIG. 8
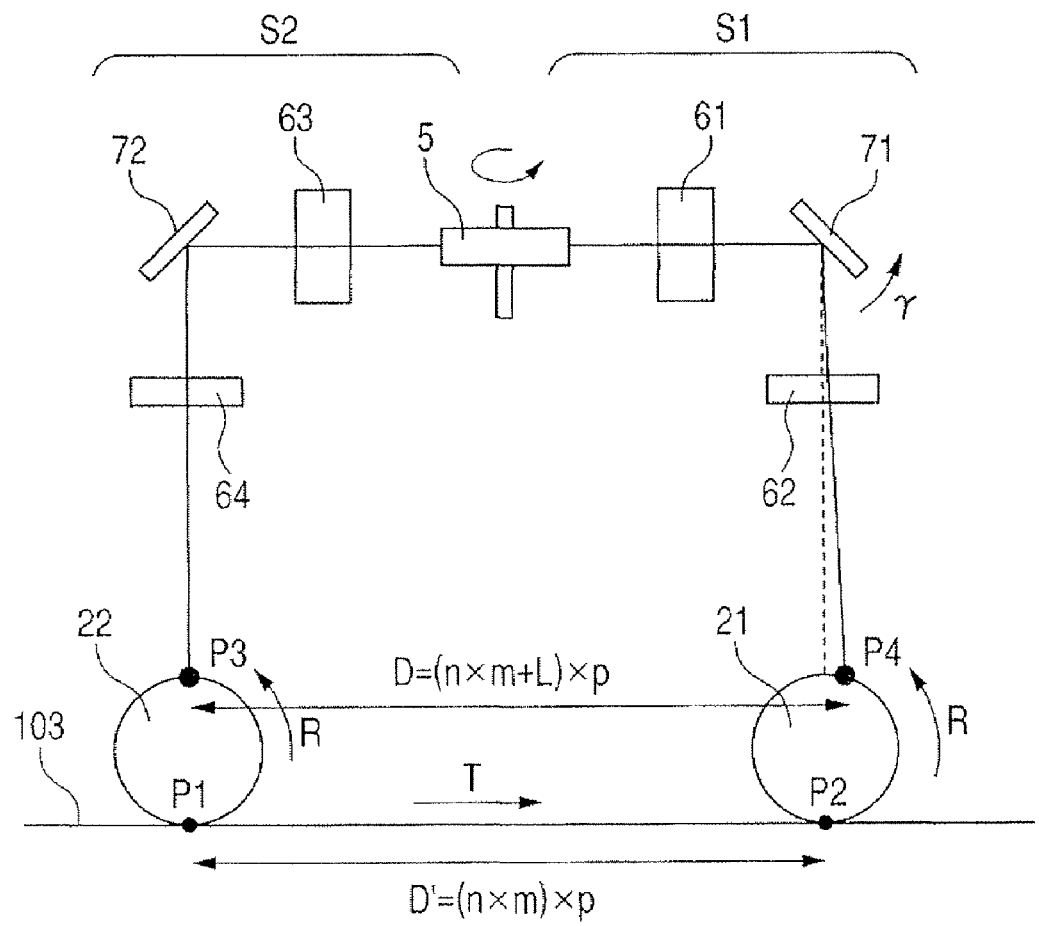
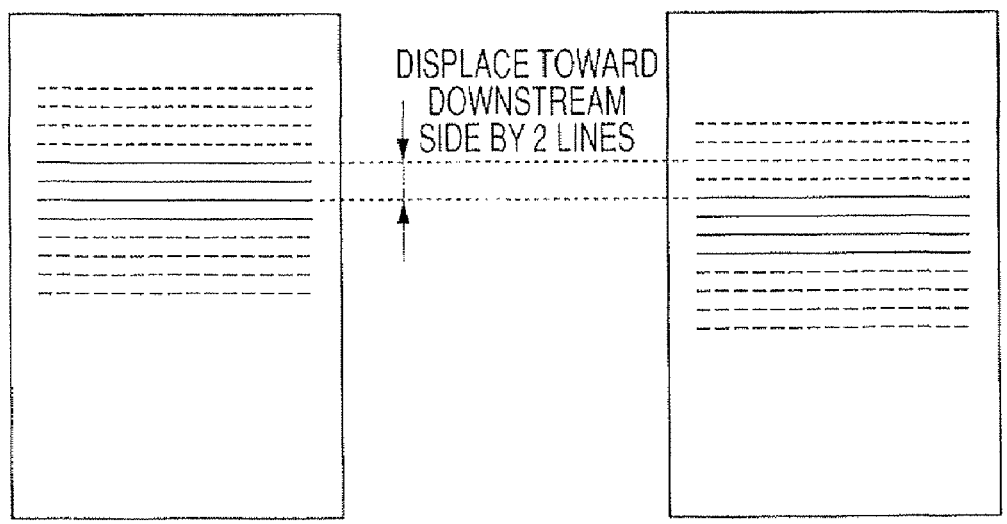

FIG. 10
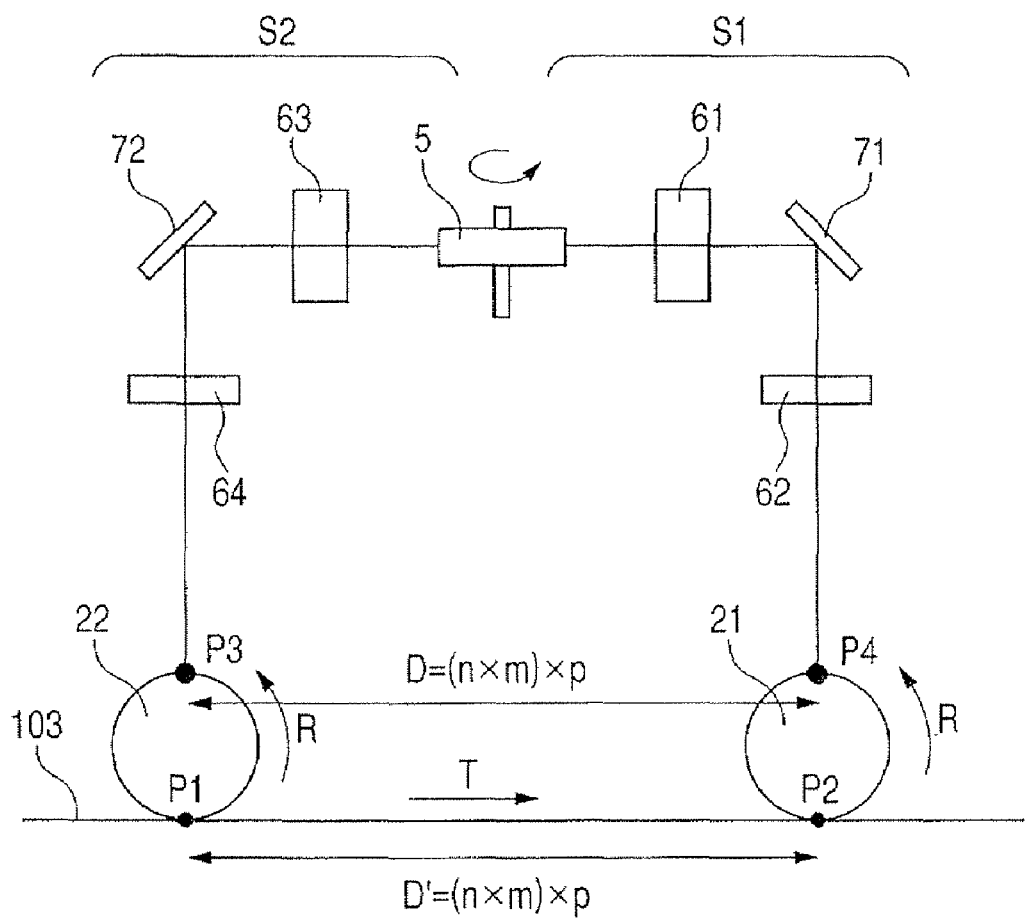
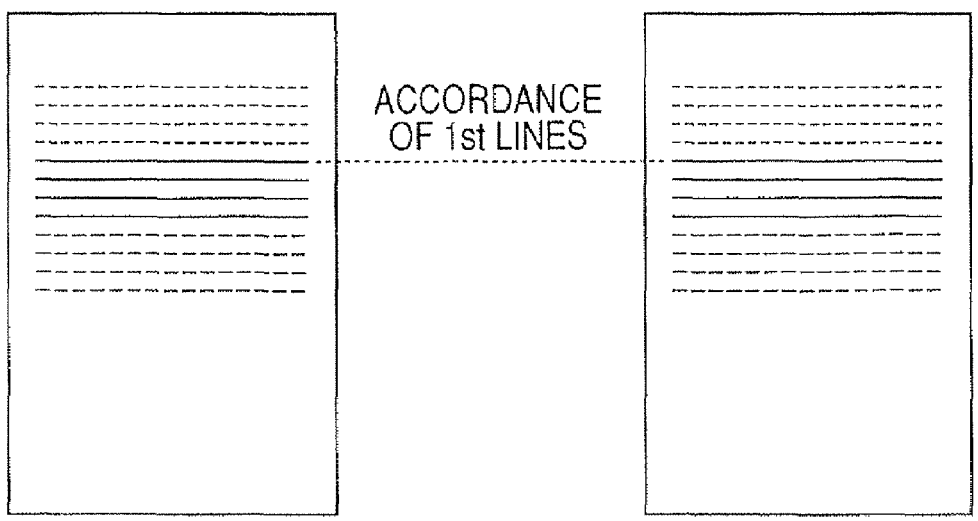

FIG. 11
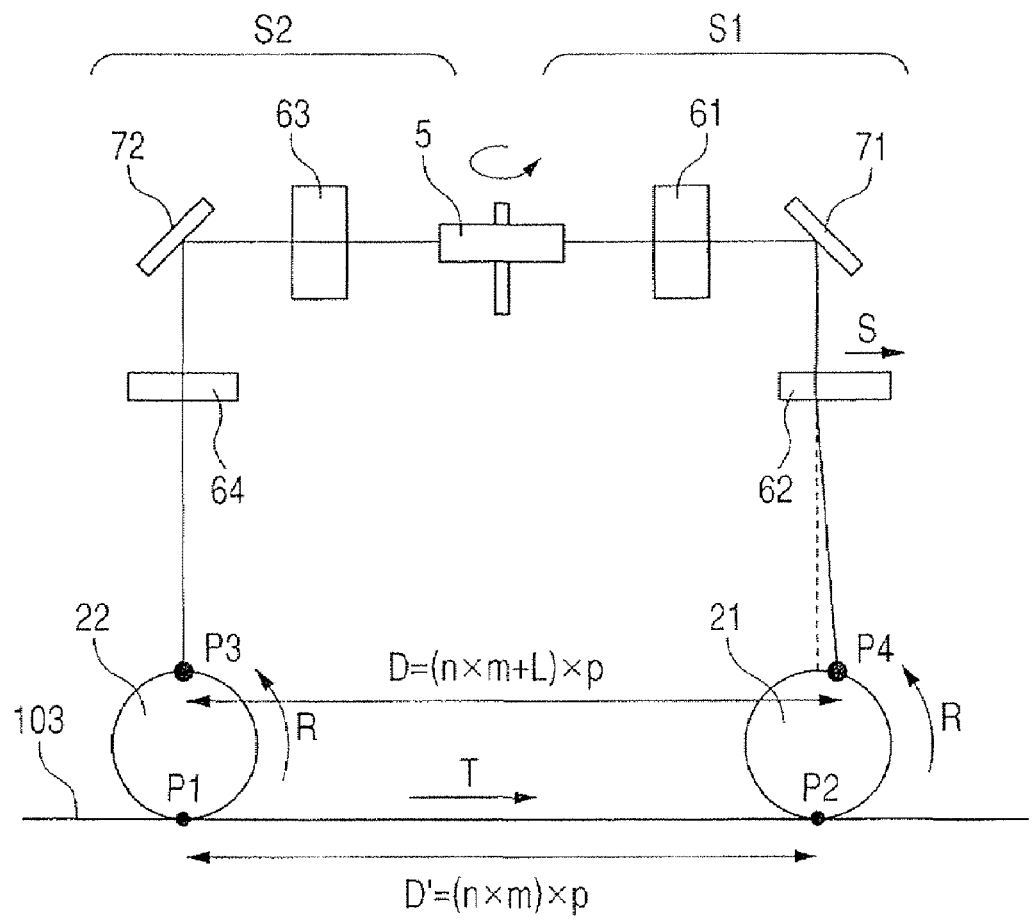
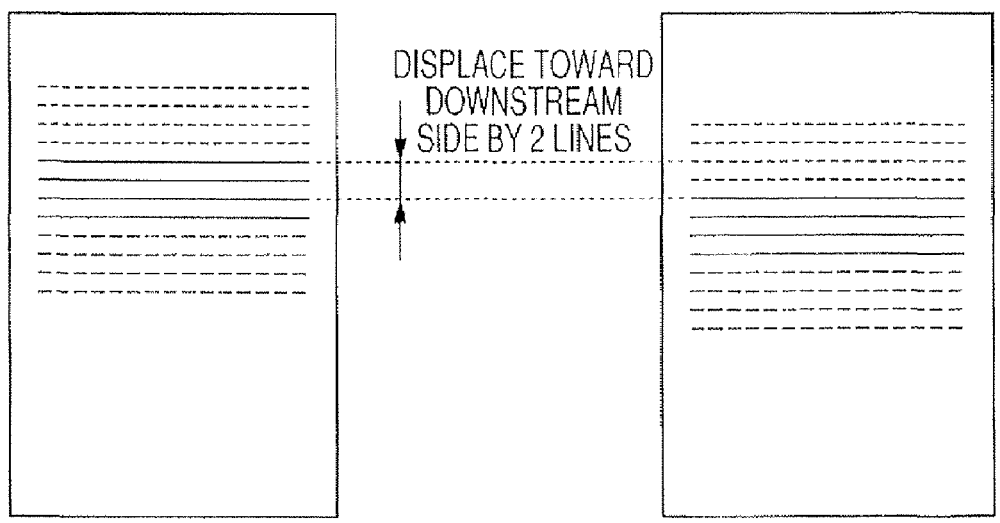

FIG. 12
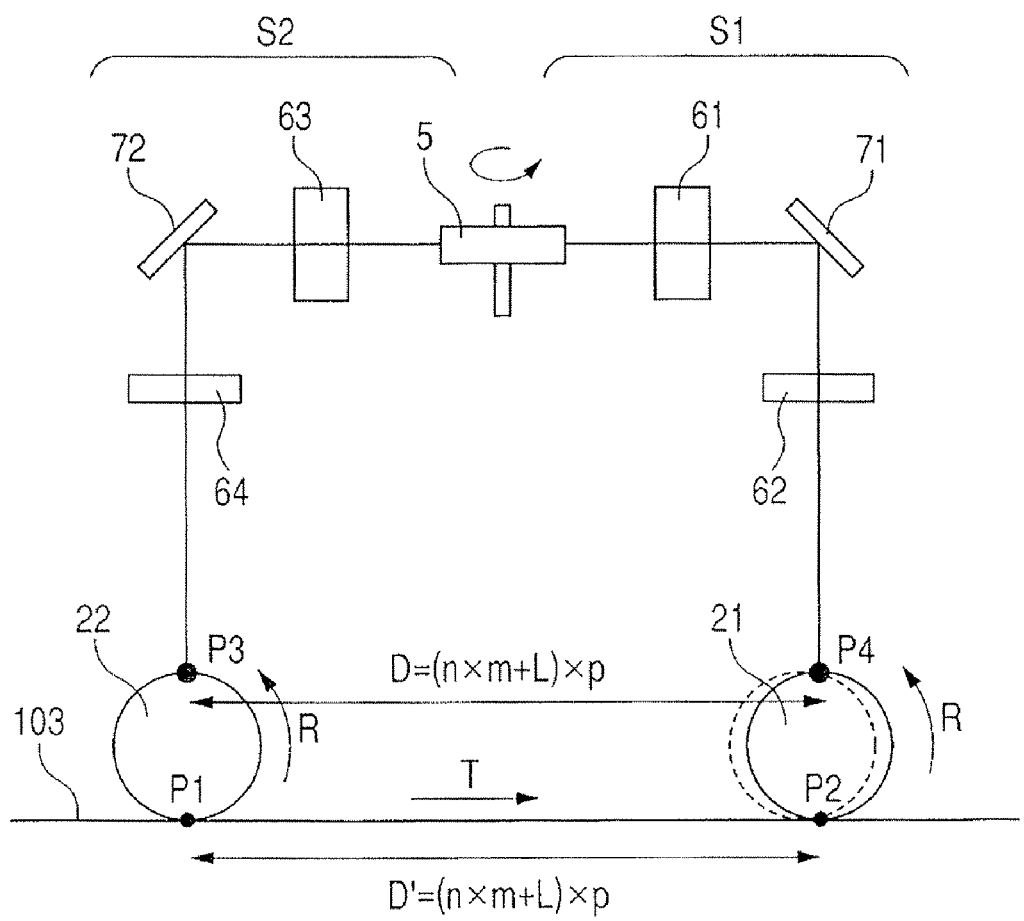
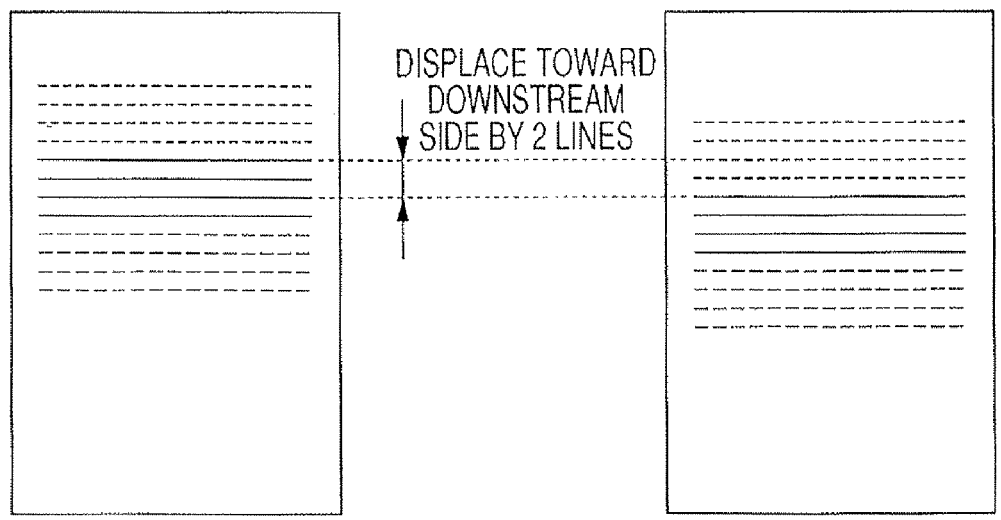

OPTICAL SCANNING APPARATUS AND COLOR IMAGE FORMING APPARATUS USING THE SAME

BACKGROUND OF THE INVENTION

1. Field of the Invention

The present invention relates to an optical scanning apparatus and a color image forming apparatus using the same. For example, the present invention is suitable for a color image forming apparatus such as a laser beam printer (LBP), a digital copying machine, or a multi-function printer, which has an electrophotographic process.

2. Description of the Related Art

Up to now, an optical scanning apparatus is used for a laser beam printer (LBP), a digital copying machine, a multi-function printer, or the like. The optical scanning apparatus is used to scan light onto at least one photosensitive drum. The scanning creates a latent image in the form of a charge distribution left on the photosensitive drum. This charge distribution is subsequently used to complete the laser print. In the optical scanning apparatus, a light beam which is optically modulated according to an image signal in light source unit and emitted therefrom is periodically deflected by an optical deflector composed of, for example, a rotary polygon mirror (polygon mirror). The deflected light beam is condensed in a spot shape on a surface of a photosensitive recording medium (photosensitive drum) by an imaging optical system having an fθ characteristic. The surface of the photosensitive recording medium is scanned with the light beam to perform image recording.

FIG. 18 is a principal part schematic view illustrating an optical scanning optical system of a conventional optical scanning apparatus.

In FIG. 18, a single or a plurality of diverged light beams emitted from a light source unit 201 are converted into a parallel light beam by a collimator lens 203. The light beam is limited by a stop 202 and then incident on a cylindrical lens 204 having a finite refractive power only in a sub-scanning direction. Of the parallel light beam incident on the cylindrical lens 204, a light beam in a main scanning direction is exited therefrom without change. In addition, a light beam in the sub-scanning direction is condensed and imaged on a deflecting surface 205a of an optical deflector 205 including a polygon mirror to form a linear image.

The light beam deflected by the deflecting surface 205a of the optical deflector 205 is guided onto a photosensitive drum surface 208 which is a surface to be scanned through an imaging lens 206 having the fθ characteristic. The optical deflector 205 is rotated in a direction indicated by an arrow "A". Therefore, the photosensitive drum surface 208 is scanned with the single or the plurality of light beams in a direction indicated by an arrow "B" (main scanning direction), to perform image information recording.

Various multi-beam optical scanning apparatus for scanning a plurality of light beams to form an image have been proposed as this type of optical scanning apparatus (see Japanese Patent application Laid-Open No. 2003-182139).

In the multi-beam optical scanning apparatus, streak-shaped density unevenness occurs in an interface region between a scanning line of a plurality of light beams scanned by first scanning and a scanning line of a plurality of light beam scanned by second scanning. According to Japanese Patent Application Laid-Open NO. 2003-182139, in order to reduce the density unevenness, an amount of light beams with which a circumference of the interface region are scanned is reduced to be smaller than an amount of light beams with which the vicinity of a center of the plurality of scanning lines are scanned.

The optical scanning apparatus according to Japanese Patent Application Laid-Open No. 2003-182139 includes respective elements necessary to reduce the streak-shaped density unevenness with respect to a single color.

For example, when a large deviation of imaging magnification of an imaging optical system in the sub-scanning direction (sub-scanning cross section) occurs or when a large deviation of an adjusted pitch interval of the scanning lines in the sub-scanning direction occurs, a certain amount of reduction effect is recognized.

However, it is difficult to completely remove the streak-shaped density unevenness.

Even if the density unevenness with respect to the single color does not become a problem, for example, when four colors of cyan (C), magenta (M), yellow (Y), and black (Bk) are superimposed on one another, the density unevenness becomes a large problem.

FIG. 19 is an explanatory diagram illustrating a state of a plurality of scanning lines which occurs in a case where a sub-scanning magnification of the imaging optical system in the circumference of an image is larger than that in the center of the image.

When a scanning line interval in the sub-scanning direction is set to a scanning line interval in the center of the image, which is determined based on a resolution of the optical scanning apparatus, scanning lines are overlapped with each other in edges of the image to increase a density in only a superimposed region in some cases.

FIG. 20 is an explanatory diagram illustrating a state of a plurality of scanning lines which occurs in a case where the sub-scanning magnification of the imaging optical system in the circumference of the image is smaller than that in the center of the image.

When the scanning line interval in the sub-scanning direction is set to the scanning line interval in the center of the image, which is determined based on the resolution of the optical scanning apparatus, scanning lines are separated from each other by one or more line spaces in the edges of the image to reduce a density of only a separated region in some cases.

The above-mentioned cases notably occur when the number of beams (scanning light beams) increases. For example, assume that the sub-scanning magnification in the circumference of the image is deviated from that in the center of the image by 5%. Here, when two-beam scanning is performed, a shift of 0.05 (=(2−1)×5/100) pixels occurs. When four-beam scanning is performed, a shift of 0.15 (=(4−1)×5/100) pixels occurs.

When eight-beam scanning is performed, a shift of 0.35 (=(8−1)×5/100) pixels occurs. When 32-beam scanning is performed, a shift of 1.55 (=(32−1)×5/100) pixels occurs. Therefore, a shift amount increases.

When the two-beam scanning is performed at a resolution of 600 dpi, a number of occurrences of the streak-shaped density unevenness are 11.8 per 1 mm. When the four-beam scanning is performed at the resolution of 600 dpi, the number of occurrence of the streak-shaped density unevenness is 5.9 per 1 mm.

As described above, a spatial frequency of the streak-shaped density unevenness becomes smaller as the number of beams increases, so the streak-shaped density unevenness is more easily visually recognized by human eyes. Therefore, up to now, when the two-beam scanning is performed, no problem occurs because a deviation amount is small and the spatial frequency is within a high frequency band which is difficult to be visually recognized by human eyes. However, the above-mentioned density unevenness becomes a problem in a case of the multi-beam optical scanning apparatus using four or more beams.

In an optical scanning apparatus using, as the light source unit, a multi-beam semiconductor laser including a plurality of light source portions arranged in one dimension, the scanning line interval in the sub-scanning direction is adjusted by rotational adjustment about an optical axis of each of the light source portions. When the imaging magnification of the entire system in the sub-scanning direction is five times and an interval between the adjacent light source portions is 100 μm, the light source portions may be tilted relative to the main scanning direction at an angle θ (=2.42625°) as illustrated in FIG. 21 in the case of the optical scanning apparatus of 1200 dpi.

In an actual case, the adjustment may be performed at an angle deviated from a designed tilt angle by an angle α. For example, as illustrated in FIG. 22, when the light source portions are tilted at θ+α (=2.92625°) because of α (=0.5°), the scanning line interval in the sub-scanning direction becomes 25.53 μm (that is, 1.2 lines). Therefore, even when a mechanism for adjusting the scanning line interval in the sub-scanning direction is provided, it is difficult to completely remove the streak-shaped density unevenness in the interface region between adjacent scanning lines. In even such a case, it is obvious that a problem occurs when the number of beam increases.

SUMMARY OF THE INVENTION

An object of the present invention is to provide an optical scanning apparatus capable of reducing streak-shaped density unevenness to prevent image deterioration of an entire color image, and a color image forming apparatus using the optical scanning apparatus.

According to an aspect of the present invention, an optical scanning apparatus is provided, which includes: a plurality of light source units, each of which includes four or more light emitting portions for radiating light beams which are optically modulated based on image data; one deflecting unit for deflecting the plurality of light beams emitted from each of the plurality of light source units for scanning; and an imaging optical system for imaging the plurality of light beams which are deflected for scanning by a deflecting surface of the deflecting unit onto a plurality of surfaces to be scanned which are provided for the respective light source unit, in which each of the plurality of surfaces to be scanned is simultaneously scanned with the plurality of light beams emitted from corresponding one of the light source units and a plurality of scanning lines are simultaneously drawn on each of the plurality of surfaces to be scanned, in which: the plurality of light beams emitted from the four or more light source portions of the corresponding one of the light source units are simultaneously deflected for scanning by the deflecting surface of the deflecting unit; and letting a first scanning line on each of the surfaces to be scanned be defined as a scanning line located on an uppermost stream side in a direction in which corresponding one of the surfaces to be scanned is moved, of a plurality of scanning lines formed by the plurality of light beams emitted from the at least four light source portions of the corresponding one of the light source units, image data corresponding to a first scanning line on at least one of the plurality of surfaces to be scanned in a k-th scanning operation by the deflecting unit is displaced by at least one line space with respect to image data corresponding to a first scanning line on another one of the plurality of surfaces to be scanned in the k-th scanning operation by the deflecting unit.

According to the present invention, it is possible to realize the optical scanning apparatus capable of reducing the streak-shaped density unevenness to prevent the image deterioration of an entire color image, and the color image forming apparatus using the optical scanning apparatus.

Further features of the present invention will become apparent from the following description of exemplary embodiments with reference to the attached drawings.

BRIEF DESCRIPTION OF THE DRAWINGS

FIG. 8 is a sub-scanning cross sectional diagram illustrating an optical scanning apparatus according to Embodiment 2 of the present invention.

FIG. 10 is a main scanning cross sectional diagram illustrating a comparative example of the optical scanning apparatus.

FIG. 11 is a sub-scanning cross sectional diagram illustrating another example of the optical scanning apparatus according to Embodiment 2 of the present invention.

FIG. 12 is a sub-scanning cross sectional diagram illustrating another example of the optical scanning apparatus according to Embodiment 2 of the present invention.

DESCRIPTION OF THE EMBODIMENTS

Hereinafter, embodiments the present invention will be described with reference to the attached drawings.

Embodiment 1

Figure 1:
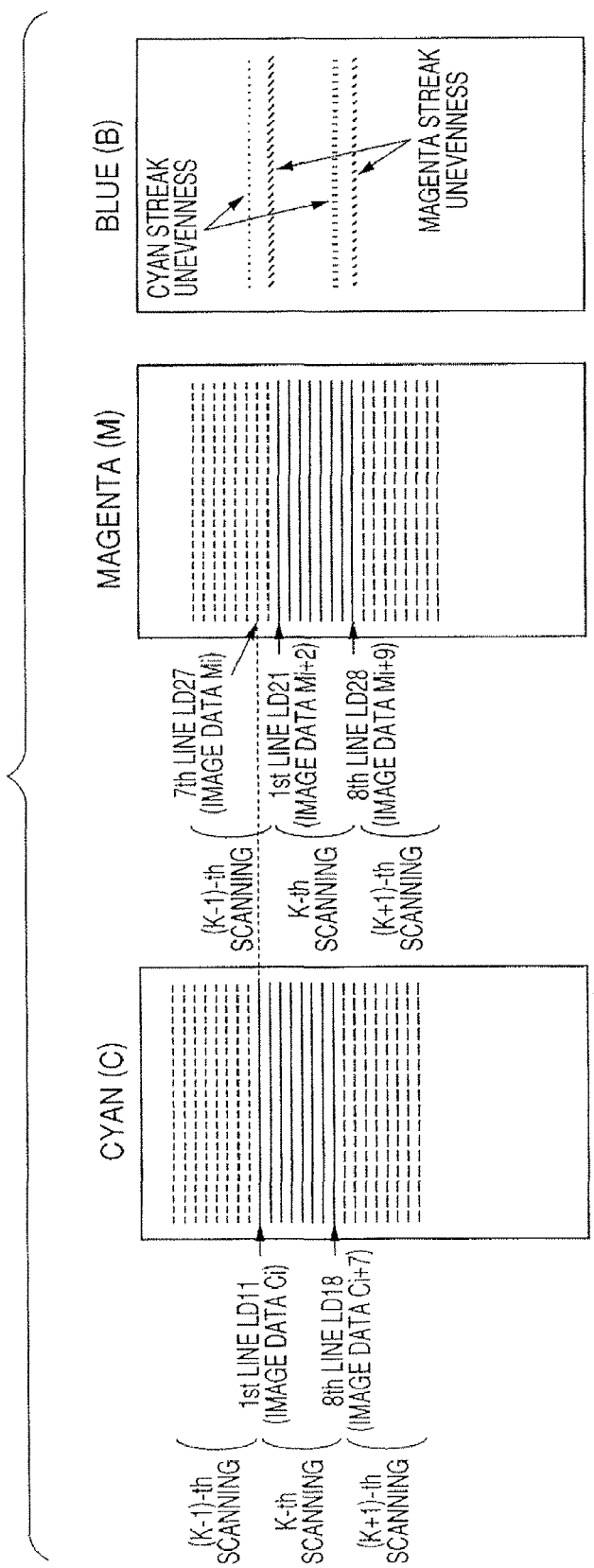
FIG. 1 illustrates a relationship between image data and a laser beam in Embodiment 1 of the present invention.

FIG. 1 illustrates a relationship between image data and a laser beam (light beam) on two scanning surfaces corresponding to a cyan (C) image and a magenta (M) image, of a plurality of scanning surfaces in an optical scanning apparatus according to Embodiment 1 of the present invention.

In this embodiment, the optical scanning apparatus includes four optical scanning optical systems (multi-beam scanning optical systems) using four monolithic multi-beam semiconductor lasers (eight-beam lasers). Each of the multi-beam semiconductor lasers includes eight light emitting portions, each of which serves as light source unit and emits a light beam optically modulated based on image data. In the optical scanning apparatus, the light beam emitted from each of the light source unit is deflected for scanning by a deflecting unit. The light beam from the deflecting unit is imaged by an imaging optical system provided corresponding to each of four surfaces to be scanned above the surfaces to be scanned which are located for each of the light source unit.

The surface to be scanned is simultaneously scanned with eight light beams by a single scanning operation by the deflecting unit. Therefore, eight scanning lines can be simultaneously drawn on the surface to be scanned.

Figure 2:
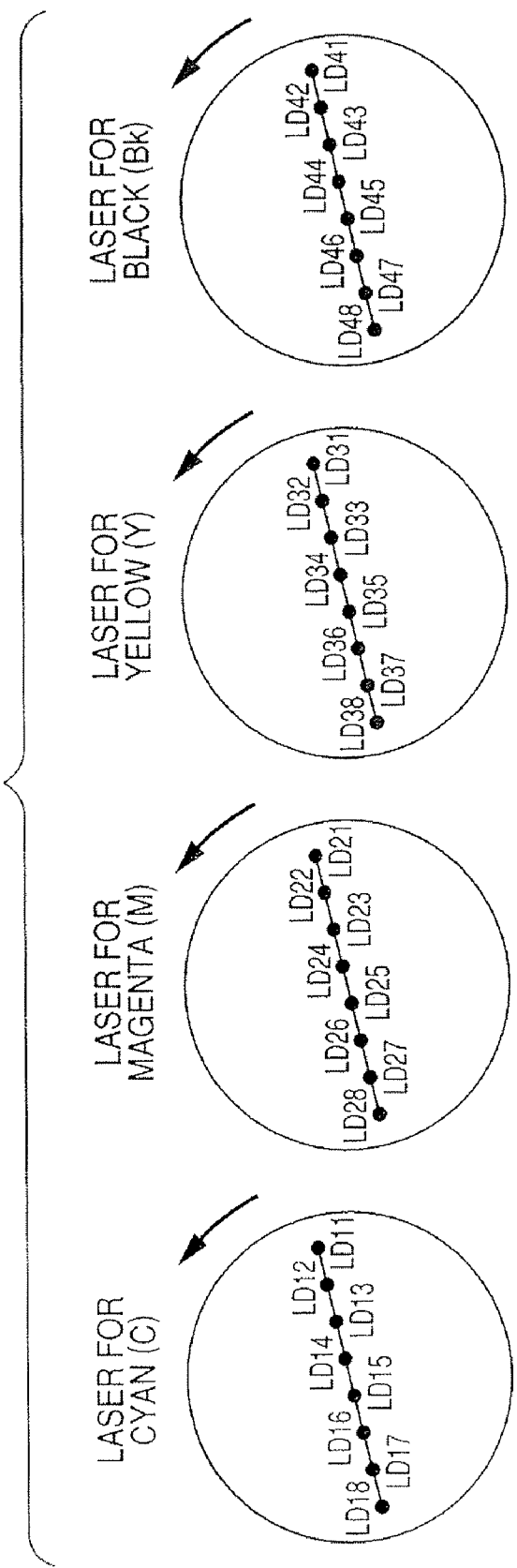
FIG. 2 illustrates monolithic multi-beam semiconductor lasers.

FIG. 2 illustrates monolithic multi-beam semiconductor lasers corresponding to four colors, respectively. In FIG. 2, eight light emitting portions LD11 to LD18 for a cyan (C) group are arranged in a straight line. Eight light emitting portions LD21 to LD28 for a magenta (M) group are arranged in a straight line. Eight light emitting portions LD31 to LD38 for a yellow (Y) group are arranged in a straight line. Eight light emitting portions LD41 to LD 48 for a black (Bk) group are arranged in a straight line. As described above, in each of the groups, the light emitting portions are arranged in the straight line and rotated about the optical axis (X-axis) of the corresponding imaging optical system (in a direction indicated by an arrow as illustrated in FIG. 2). Therefore, the scanning line interval in the sub-scanning direction is adjusted.

Figure 3:
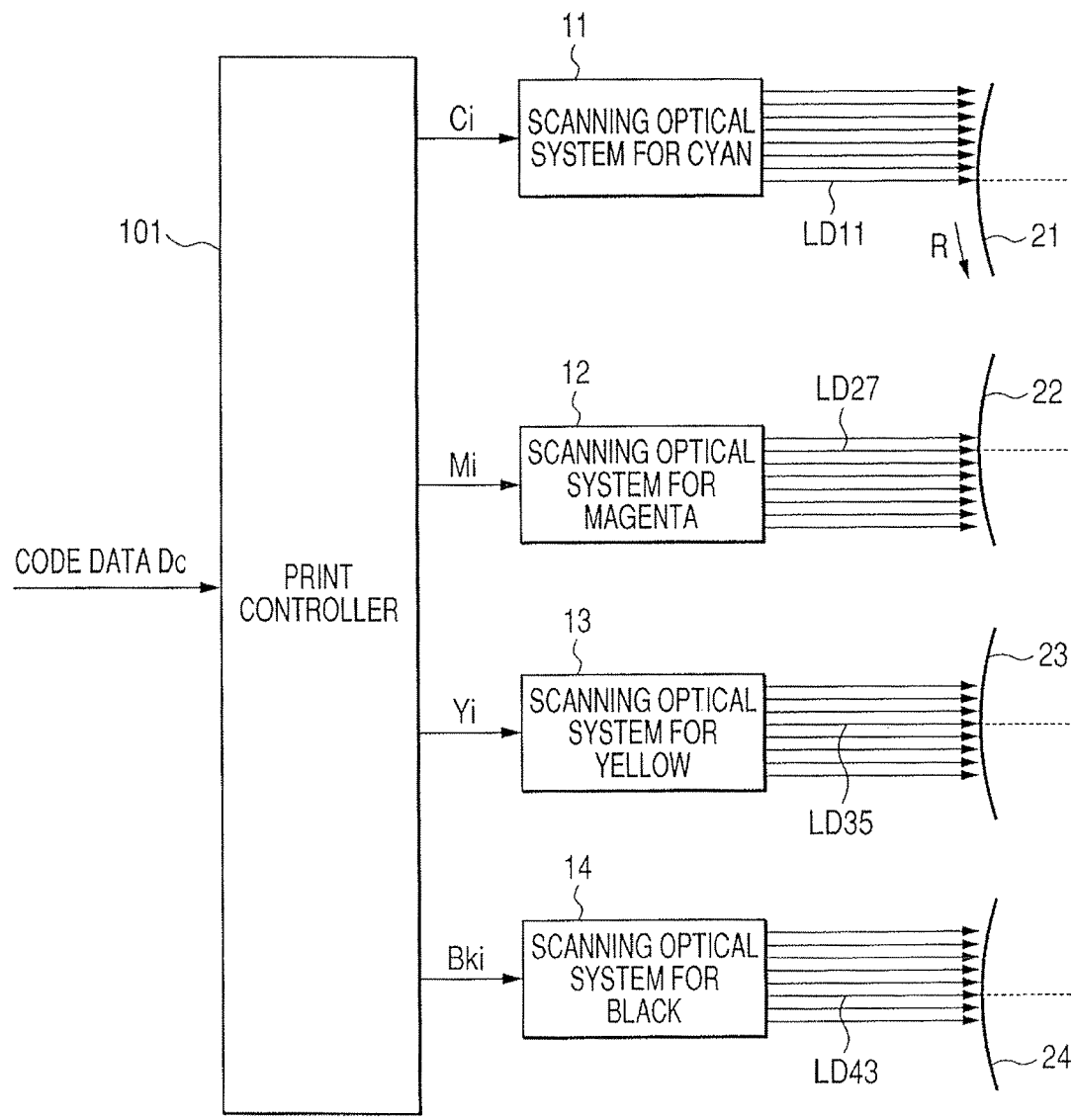
FIG. 3 is a principal-part cross sectional diagram illustrating an image forming apparatus according to Embodiment 1 of the present invention.

FIG. 3 is a schematic diagram illustrating an image forming apparatus using the optical scanning apparatus according to Embodiment 1 of the present invention. In FIG. 3, code data Dc output from an external device such as a personal computer (not illustrated) is input into a print controller 101. The code data Dc is converted into respective color image data (Ci (cyan), Mi (magenta), Yi (yellow), and Bki (black)) of color image data ID by the print controller 101. The pieces of color image data are input into the respective optical scanning optical systems. A subscript "i" denotes a number associated with image data in the sub-scanning direction.

As illustrated in FIG. 1, of eight scanning lines which are simultaneously scanned in the k-th scanning, a scanning line located on an uppermost stream side in a direction in which a surface to be scanned is moved (sub-scanning direction) is defined as a first scanning line. An image corresponding to the first scanning line is obtained by controlling the turning on/off of the light emitting portion LD11 based on i-th cyan image data Ci of the color image data ID. An image corresponding to a second scanning line is obtained by controlling the turning on/off of the light emitting portion LD12 based on cyan image data Ci+1. The same operation is separately repeated until an image corresponding to an eighth scanning line is obtained by controlling the turning on/off of the corresponding light emitting portion.

When the deviation in imaging magnification of the imaging optical system in the sub-scanning direction occurs or the deviation in the adjusted scanning line interval in the sub-scanning direction occurs as described above, density unevenness is caused between the k-th scanning and (k+1)-th scanning, that is, between the light emitting portion LD18 and the light emitting portion LD11. Similarly, even in the case of a magenta image, the density unevenness is caused between the light emitting portion LD28 and the light emitting portion LD21.

In the case of the magenta (M) image, an image corresponding to a first scanning line scanned in the k-th scanning is obtained by controlling the turning on/off of the light emitting portion LD21 based on (i+2)-th magenta image data Mi+2 of the color image data ID. Therefore, a position in which cyan density unevenness occurs can be displaced from a position in which magenta density unevenness occurs in the sub-scanning direction by two line spaces. Thus, streak-shaped density unevenness in the case of a blue (B) image can be reduced compared with the case where a cyan interface region and a magenta interface region are superimposed on each other.

As described above, in each of the optical scanning optical systems, image data corresponding to a scanning line located on an uppermost stream side (first scanning line) in a direction in which a surface to be scanned is moved (sub-scanning direction), of scanning lines formed by a single scanning, is displaced by one or more line spaces on the surface to be scanned. In this embodiment, the image data is displaced by two line spaces.

In other words, a scanning beam is displaced for the same image data. In FIG. 3, a scanning beam corresponding to the image data Ci is emitted from the light emitting portion LD11. A scanning beam corresponding to the corresponding image data Mi is emitted from the light emitting portion LD27. A scanning beam corresponding to the image data Yi is emitted from the light emitting portion LD35. A scanning beam corresponding to the image data Bki is emitted from the light emitting portion LD43. A photosensitive drum is rotated in a direction indicated by reference symbol R illustrated in FIG. 3. Four color images are superimposed on an intermediate transferring belt (not illustrated).

At this time, the pieces of image data Ci, Mi, Yi, and Bki are superimposed on one another on the intermediate transferring belt at the same position to form a full color image. In order to obtain such a structure, there are various methods as described in subsequent embodiments. According to the simplest method, it is only necessary to move scanning optical systems 11, 12, 13, and 14 relative to photosensitive drums 21, 22, 23, and 24 in the sub-scanning direction.

Therefore, it is possible to reduce the streak-shaped density unevenness caused when the images of four colors of cyan, magenta, yellow, and black are superimposed on one another.

A control of the multi-beam semiconductor laser at the beginning of image writing is hereinafter described.

In the first scanning, the beam emission from the semiconductor lasers LD11-LD18 are controlled through sending the eight cyan image data C1-C8 to the semiconductor lasers LD11-LD18, respectively, to thereby enable the simultaneous scanning for exposure with eight image data. On the other hand, as to the magenta data in the first scanning, only semiconductor lasers LD27 and LD28 among semiconductor lasers LD21-LD28 receive the real image data. The image data M1 is sent to the semiconductor laser LD27, and the image data M2 is sent to the semiconductor laser LD28. The image data Mi (where i=3 or greater) are to be sent from the respective semiconductor lasers LD21-LD26 in the second scanning. Consequently, the semiconductor lasers LD21-LD26 receive empty image data so as to forcibly stop the beam emission in the first scanning.

The yellow and black images are similarly controlled. As is described above, in a first scanning which is the beginning of the image writing, the number of empty image data are inserted, which number is obtained by substituting the number of lines shifting in the sub scanning direction from the number of emission points of the multi-beam semiconductor lasers.

By configuring as described above, a full color image including cyan, magenta, yellow and black can be formed from the first line which is the beginning of the writing. Further, in an ending of the scanning, it is possible to form a full color image including cyan, magenta, yellow and black until the last line by adding an appropriate number of empty image data lines to the respective colors.

Figure 4:
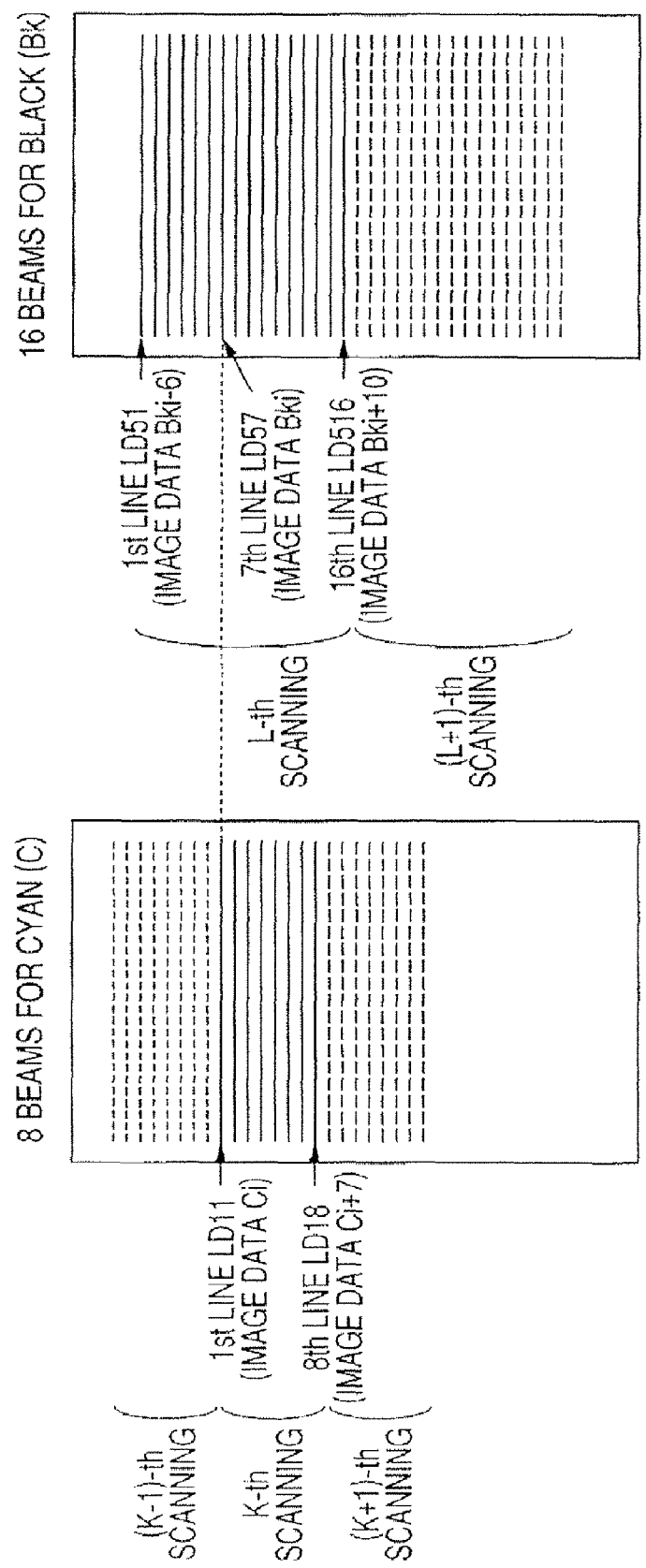
FIG. 4 illustrates a relationship between the image data and the laser beam in Embodiment 1 of the present invention.

As illustrated in FIG. 4, 16 beams (16 beam lasers) may be used for black only so that the number of light emitting portions is different from that of each of the other optical scanning optical systems. According to such a structure, a monochrome image can be generated at a printing speed of approximately double that in a case of a color image.

Note that, when the number of light emitting portions (n1) is not equal to an integral multiple of the smallest number of light emitting portions (n2) (n1=n2×"a": "a" is a positive integer), interface regions are superimposed on each other at any position in the sub-scanning direction. Therefore, when the smallest number of light emitting portions is eight, it is necessary to perform scanning with the number of beams which is an integral multiple of eight, such as 16, 24, 32, 40, or the like.

This embodiment effectively acts on a light source unit including four or more light source portions. Normally, a color image forming apparatus is configured based on four colors of cyan, magenta, yellow, and black. Therefore, the respective color interface regions can be prevented from being superimposed on one another. In the case of six colors including light cyan and light magenta, even when a light cyan interface region is overlapped with another color interface region or even when a light magenta interface region is superimposed on another color interface region, streak-shaped density unevenness is inconspicuous. Because the sensitivity of human eyes to yellow is low, a yellow interface region may be superimposed on another color interface region.

Figure 5:
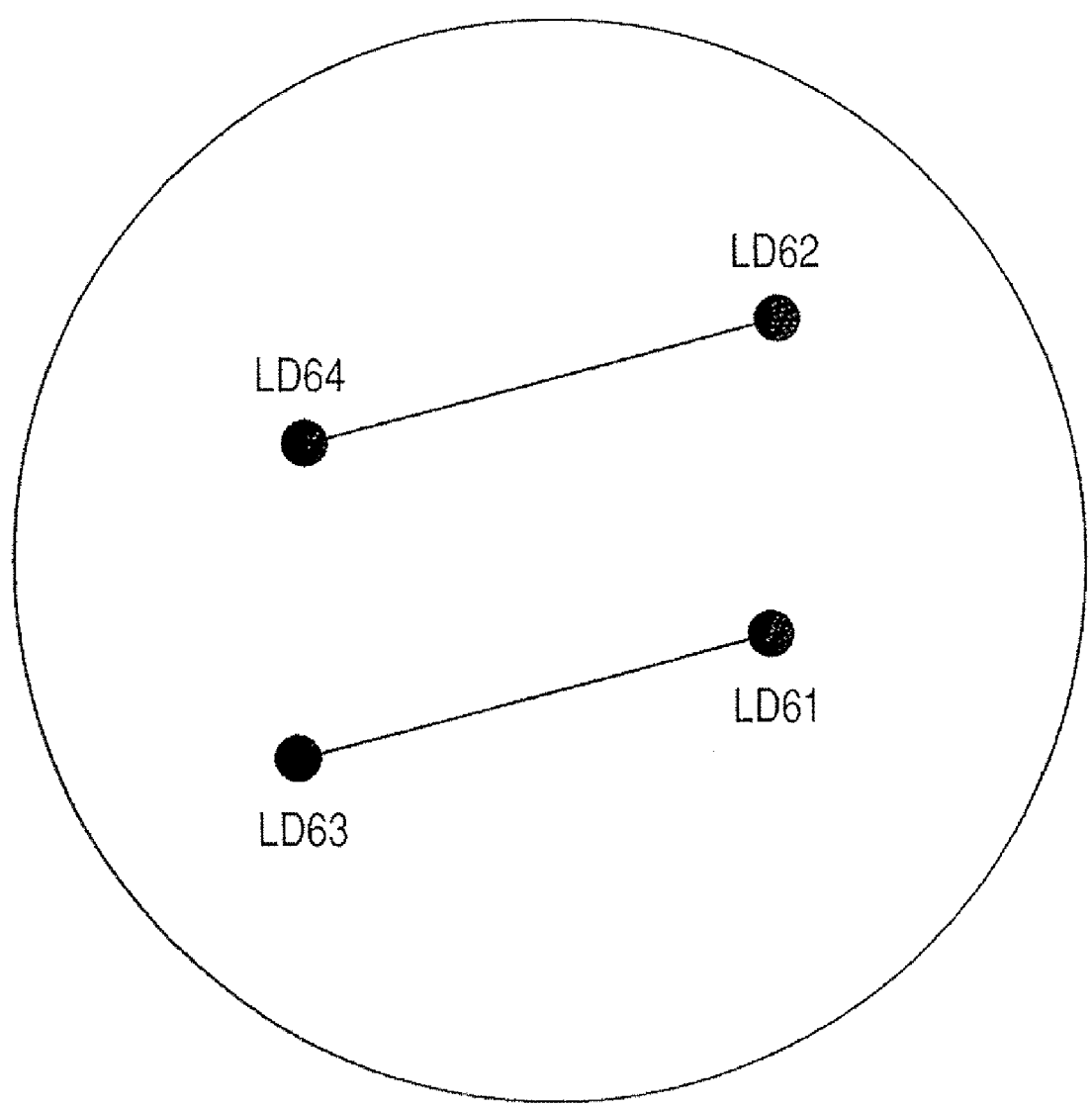
FIG. 5 illustrates a vertical-cavity surface-emitting laser.
Figure 6:
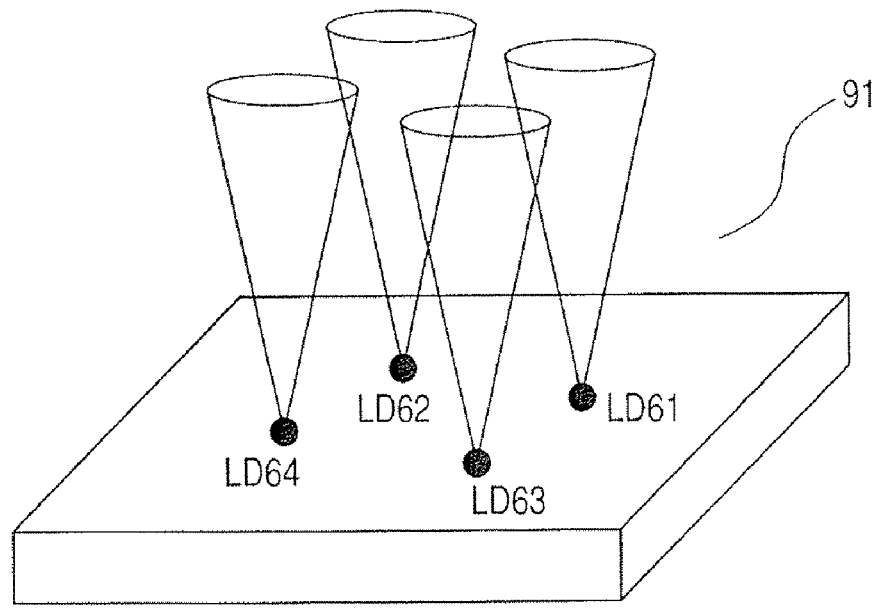
FIG. 6 is a principal-part perspective view illustrating the vertical-cavity surface-emitting laser.

FIGS. 5 and 6 illustrate a vertical-cavity surface-emitting laser (VCSEL) of two-dimensional arrangement. The vertical-cavity surface-emitting laser is easily provided with a multi-beam system in view of an element structure. In recent years, the vertical-cavity surface-emitting laser has been used as a light source of a high-speed and high-resolution printer.

In contrast, in the case of the two-dimensional arrangement, it is difficult to adjust the scanning line interval in the sub-scanning direction by the rotational adjustment of the light source, so it is likely to cause streak-shaped density unevenness in an interface region. Therefore, when this embodiment is applied to the vertical-cavity surface-emitting laser, the effect thereof is produced.

Figure 7:
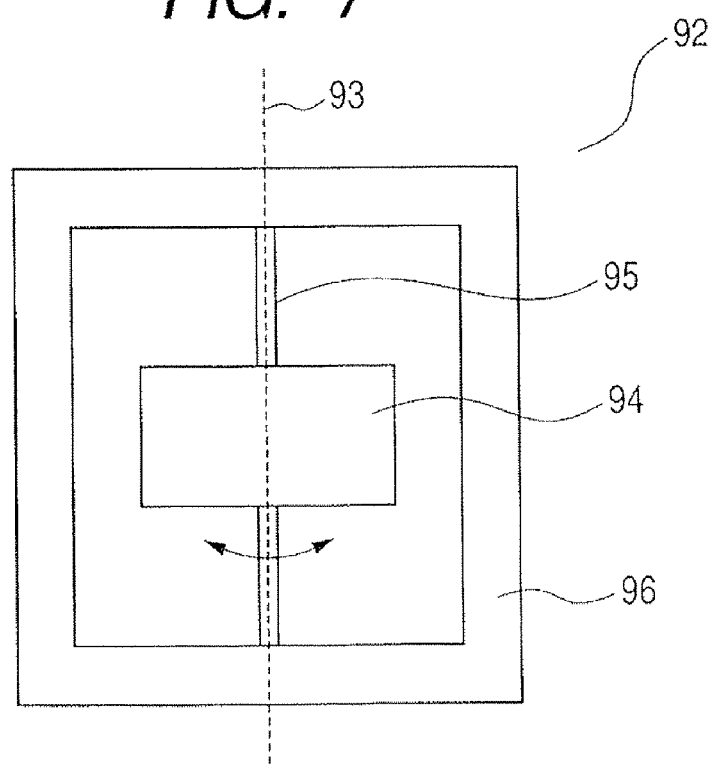
FIG. 7 illustrates a galvano mirror.

A galvano mirror as illustrated in FIG. 7 or a rotary polygon mirror as described later in Embodiment 2 or the like may be used as an optical deflector serving as the deflecting unit.

A galvano mirror 92 illustrated in FIG. 7 is a micro electro mechanical system (MEMS) manufactured by a semiconductor process or the like, and includes a deflecting surface (lateral scanning surface) 94 and a shaft 93 which acts as the center of oscillation of the deflecting surface 94. The deflecting surface 94 is connected with a base portion 96 through a beam portion 95, so a mechanical resonance frequency is set by such a structure. In the galvano mirror 92, the deflecting surface 94 can be tilted relative to the shaft 93 by the action of an external periodic force. An incident light beam can be deflected by the tilt of the deflecting surface 94. A force such as an electromagnetic force or an electrostatic force can be used as the external periodic force.

As described above, the galvano mirror includes only the single deflecting surface. Therefore, when the number of prints produced by a printer is to be increased, the number of beams becomes larger than that in the case of the rotary polygon mirror. Thus, when the galvano mirror is used in this embodiment, the effect thereof is produced.

In the case of the rotary polygon mirror, pitch unevenness is caused by a tilt of each deflecting surface. Therefore, it is more likely to cause the density unevenness in conjunction with, for example, the density unevenness caused by the deviation of the imaging magnification in the sub-scanning direction. Thus, even when the rotary polygon mirror is used for the optical scanning apparatus, sufficient effect of the present invention is produced.

As described above, in this embodiment, the image data corresponding to the first scanning line on one of the surfaces to be scanned is displaced with respect to the image data corresponding to the first scanning line on each of the other surfaces to be scanned by one or more line spaces. Therefore, it is possible to reduce the streak-shaped density unevenness caused when the images of four colors of cyan, magenta, yellow, and black are superimposed on one another.

Embodiment 2

FIG. 8 is a principal-part cross sectional diagram in the sub-scanning direction (sub-scanning cross sectional diagram) illustrating an optical scanning apparatus according to Embodiment 2 of the present invention.

In FIG. 8, an optical deflector 5 serving as a deflecting unit includes a rotary polygon mirror (polygon mirror) and is shared by two optical scanning optical systems S1 and S2.

Each of imaging optical elements (imaging lenses) 61, 62, 63, and 64, which corresponds to a component of an imaging optical system, has an fθ characteristic and is used to suitably correct a field curvature in each of the main scanning direction and the sub-scanning direction. Each of mirrors 71 and 72 is a mirror for bending an optical path included in the imaging optical system, and has a function for downwardly bending a light beam deflected for scanning by the optical deflector 5 by approximately 90° in the sub-scanning direction. In each of photosensitive drums 21 and 22, an electrostatic latent image is formed by a light beam from each of the optical scanning optical systems S1 and S2 and is then visualized as a toner image by a developing device (not illustrated). Each of the photosensitive drums 21 and 22 is rotated in the direction indicated by the arrow R illustrated in FIG. 8. An intermediate transferring belt 103 is moved in a direction indicated by reference symbol T.

First, the toner image formed by the optical scanning optical system S2 is transferred onto the intermediate transferring belt 103 at a transfer point P1. After that, the toner image formed by the optical scanning optical system S1 is transferred onto the intermediate transferring belt 103 at a transfer point P2. Therefore, a color image is formed on the intermediate transferring belt 103. In general, two optical scanning apparatus, each of which is the optical scanning apparatus illustrated in FIG. 8, are arranged in parallel to form the color image with four colors (cyan, magenta, yellow, and black).

Figure 9:
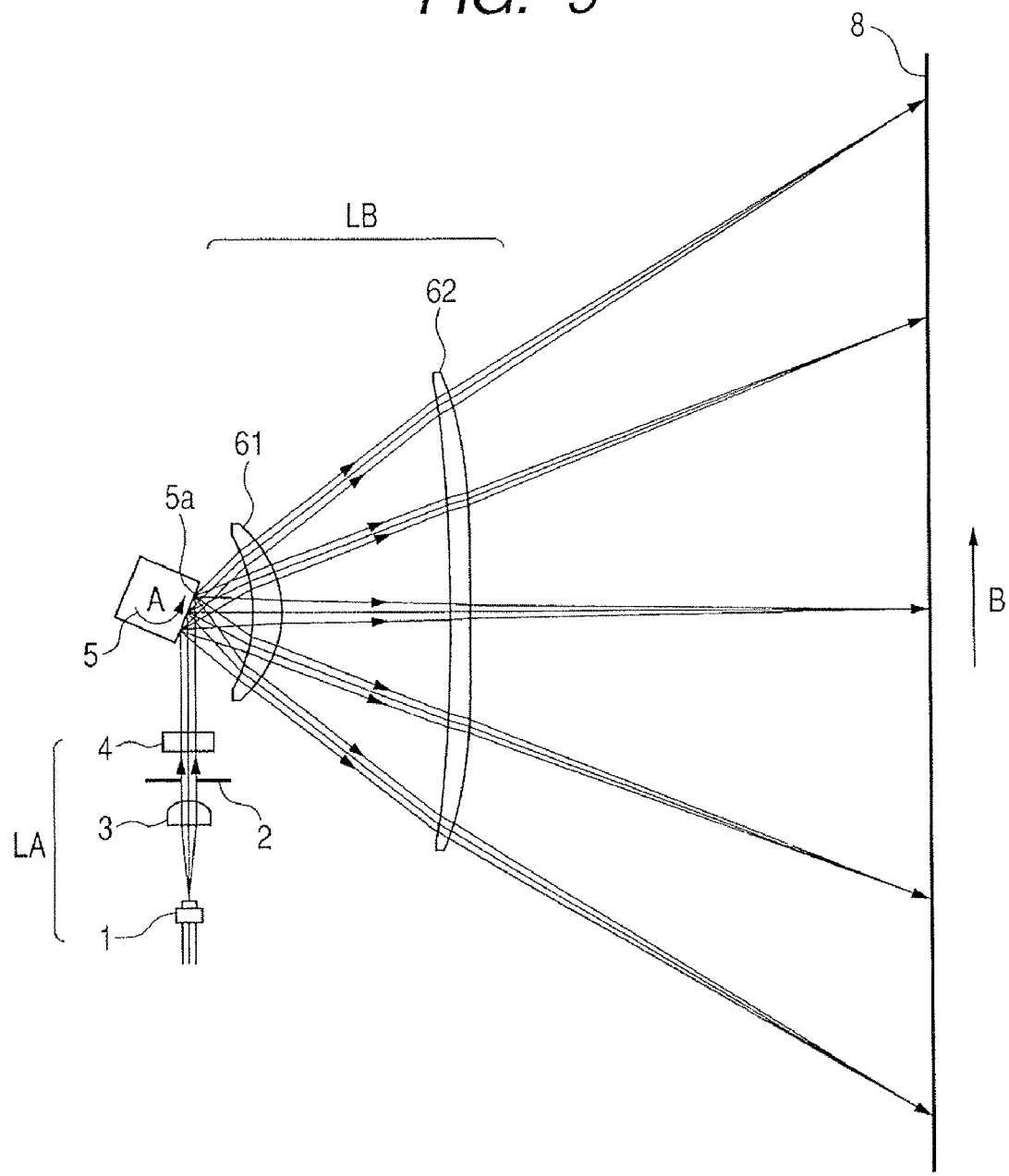
FIG. 9 is a main scanning cross sectional diagram illustrating the optical scanning apparatus according to Embodiment 2 of the present invention.

FIG. 9 is a principal-part cross sectional diagram in the main scanning direction (main scanning cross sectional diagram) illustrating an optical scanning optical system of an optical scanning apparatus which is used in this embodiment.

In FIG. 9, a light source unit 1 having four light emitting portions (multi-beam semiconductor laser) is an infrared light source for generating light beams, each of which has a wavelength λ of 790 nm. In this embodiment, the light source unit 1 includes the single multi-beam semiconductor laser. However, the present invention is not limited to this. For example, two or more semiconductor lasers may be provided. Light beams emitted from the semiconductor lasers may be combined with each other by a prism or the like.

A condensing lens (collimator lens) 3 serving as a condensing optical system is used to convert a diverged light beam emitted from the light source unit 1 into a parallel light beam. An aperture stop 2 is used to regulate a quantity of a light beam passing therethrough to shape a beam form thereof.

A cylindrical lens 4 has certain power (refractive power) only in the sub-scanning cross section (sub-scanning direction), and is used to image the light beam, which has passed through the condensing lens 3 on a deflecting surface 5a of the optical deflector 5 in the sub-scanning cross section, thereby forming a linear image.

The condensing lens 3 and the cylindrical lens 4 can be configured as an optical element. Each of the condensing lens 3, the aperture stop 2, the cylindrical lens 4, and the like as described above is a component of an incident optical system LA.

The optical deflector 5 serving as the deflecting unit is composed of, for example, a polygon mirror having four surfaces (rotary polygon mirror) and is rotated at a constant speed by a driving unit such as a motor (not illustrated) in the direction indicated by the arrow "A" illustrated in FIG. 9.

An imaging optical system (fθ lens system) LB has a condensing function and an fθ characteristic, and is composed of first and second imaging lenses (fθ lenses) 61 and 62, each of which is made of a plastic material.

In this embodiment, the imaging optical system LB is composed of the two lenses. However, the present invention is not limited to this. For example, the imaging optical system LB can be configured by a single lens or three or more lenses.

The imaging optical system LB images, on a photosensitive drum surface 8 which is the surface to be scanned, the light beam based on image information, which is deflected for scanning by the deflecting surface of the optical deflector 5. The imaging optical system LB achieves an optical face tangle error correction on the deflecting surface by bringing the deflecting surface 5a of the optical deflector 5 and the photosensitive drum surface 8 into a conjugate relation in the sub-scanning cross section.

A shape of a meridian line of each of the incidence surface and the exit surface of each of the imaging lenses 61 and 62 is an aspherical shape which can be represented by a function up to the tenth order. Assume that an origin is set at an intersection between the imaging lenses 61 and 62 and an optical axis, the direction of the optical axis is set as an X-axis, and an axis orthogonal to the optical axis in the main scanning cross section is set as a Y-axis. In this case, a meridian direction corresponding to the main scanning direction is expressed by the following expression $$X = \frac{\frac{Y^2}{R}}{1 + \sqrt{1-(1+k)\left(\frac{Y}{R}\right)^2}} + B4 \times Y^4 + B6 \times Y^6 + B8 \times Y^8 + B10 \times Y^{10} \quad (a)$$

where R denotes a curvature radius of the meridian line and K, B4, B6, B8, and B10 denote aspherical coefficients.

A sagittal direction corresponding to the sub-scanning direction is expressed by the following expression.

$$S = \frac{\frac{Z^2}{Rs^*}}{1 + \sqrt{1-\left(\frac{Z}{Rs^*}\right)^2}} \quad (b)$$

Here, S denotes a sagittal line shape defined in a plane which includes the normal of the meridian line at each position in the meridian direction and which is orthogonal to a main scanning plane.

Here, a curvature radius (sagittal line curvature radius) Rs* in the sub-scanning direction at a position separated from the optical axis by a distance Y in the main scanning direction is represented by the following expression $$Rs^* = Rs \times (1 + D2 \times Y^2 + D4 \times Y^4 + D6 \times Y^6 + D8 \times Y^8 + D10 \times Y^{10})$$

where Rs denotes the sagittal line curvature radius on the optical axis, and D2, D4, D6, D8, and D10 denote sagittal line variation coefficients.

Although the surface shapes of the imaging lenses 61 and 62 in this embodiment are defined by the above-mentioned expressions, the surface shapes are not limited by this embodiment.

As illustrated in FIG. 8, a distance between an imaging point P4 of a first line formed by the optical scanning optical system S1 and an imaging point P3 of a first line formed by the optical scanning optical system S2 is expressed by reference symbol D (mm). A distance between the transfer point P2 between the photosensitive drum 21 and the intermediate transferring belt 103 and the transfer point P1 between the photosensitive drum 22 and the intermediate transferring belt 103 is expressed by reference symbol D' (mm). In this embodiment, the distance D (mm) is set such that the distance D (mm) becomes longer than the distance D' (mm) by two line spaces.

Assume that the scanning line interval in the sub-scanning direction which is determined from the resolution of the optical scanning apparatus is expressed by reference symbol p (mm), the number of light source portions of the light source unit is expressed by reference symbol "n", "m" denotes a positive integer, and L denotes an integer satisfying 1≦L≦n−1. In this embodiment, the mirror 71 is tilted by an angle γ to satisfy D=(n×m+L)×p.

For example, in the case where the resolution is 1200 dpi, the scanning line interval p (mm) is obtained as follows.

$p=25.4/1200=0.021167$ mm

When the respective components are provided as described above, a first line toner image formed on the photosensitive drum 21 and a first line toner image formed on the photosensitive drum 22 are displaced from each other by two line spaces in the sub-scanning direction. Therefore, the streak-shaped density unevenness caused by the optical scanning optical system S1 and the streak-shaped density unevenness caused by the optical scanning optical system S2 can be displaced from each other by two line spaces in the sub-scanning direction. Thus, the streak-shaped density unevenness on the entire color image can be made inconspicuous.

Even in the case where first line image data corresponding to each color is displaced, when the distance D between the imaging points is set to satisfy D=(n×m+L)×p, the respective color image data Yi, Mi, Ci, and Bki produced based on the same original image data can be superimposed on one another in the same position on the intermediate transferring belt.

A comparative embodiment is illustrated in FIG. 10. FIG. 10 is a principal part cross sectional diagram in the sub-scanning direction (sub-scanning cross sectional diagram), illustrating the comparative example. In FIG. 10, the same components as those illustrated in FIG. 8 are expressed by the same symbols.

The comparative embodiment of FIG. 10 illustrates the case where the distance D (mm) between the imaging points P3 and P4 of the first lines formed by the optical scanning optical systems is equal to the distance D' (mm) between the transfer points P1 and P2 to the intermediate transferring belt (D=D'=(n×m)×p). In this case, the first line formed by the optical scanning optical system S1 and the first line formed by the optical scanning optical system S2 are aligned with each other in the sub-scanning direction. Therefore, points at which the streak-shaped density unevenness occurs coincide with each other in the sub-scanning direction, with the result that the density unevenness increases.

Although not illustrated in FIG. 8, the imaging points can be displaced from each other by the shift of the mirror 71 in the same manner. Only one of the imaging points of the optical scanning optical systems may be displaced or both the imaging points of the optical scanning optical systems may be displaced.

FIG. 11 is a principal-part cross sectional diagram in the sub-scanning direction (sub-scanning cross sectional diagram), illustrating another embodiment of the optical scanning apparatus according to Embodiment 2 of the present invention. In FIG. 11, the same components as those illustrated in FIG. 10 are expressed by the same symbols.

FIG. 11 illustrates the case where the imaging point P4 is displaced by shifting the imaging lens 62 serving as the imaging optical element in a direction indicated by an arrow S (sub-scanning direction) relative to the optical axis of the imaging optical system.

Note that the imaging lens 64 is not shifted in the sub-scanning direction relative to the optical axis of the imaging optical system. In addition, the imaging lens 64 is not tilted about an axis parallel to the main scanning direction, which serves as a rotating axis.

Even in the case where the imaging lens 62 is used, as illustrated in FIG. 11, the imaging lens 62 is shifted in the direction indicated by the arrow S (sub-scanning direction) relative to the optical axis of the imaging optical system, and the imaging lens 62 is tilted about the axis parallel to the main scanning direction, which serves as the rotating axis, so the imaging point P4 can be displaced.

Even when the imaging lens 62 is not shifted in the direction indicated by the arrow S (sub-scanning direction) relative to the optical axis of the imaging optical system, and the imaging lens 62 is only tilted about the axis parallel to the main scanning direction, which serves as the rotating axis, the imaging point P4 can be displaced.

In other words, in this embodiment, in order to displace the positions of the imaging points P3 and P4 with respect to each other in the sub-scanning direction on the photosensitive drum, the amount of shift of the imaging lens 62 in the sub-scanning direction relative to the optical axis of the imaging optical system is made different from the amount of shift of the imaging lens 64.

In order to displace the positions of the imaging points P3 and P4 with respect to each other in the sub-scanning direction on the photosensitive drum, the amount of tilt of the imaging lens 62 about the axis parallel to the main scanning direction, which serves as the rotating axis may be made different from the amount of tilt of the imaging lens 64.

Although not illustrated, when the optical elements (collimator lens 3 and the cylindrical lens 4) included in the incident optical system LA are shifted in the sub-scanning direction relative to the optical axis of the incident optical system LA, or when the optical elements included in the incident optical system LA are tilted about the axis parallel to the main scanning direction, which serves as the rotating axis, the same effect as that in Embodiment 2 described above can be obtained.

For example, even when the light source unit 1, the collimator lens 3, the cylindrical lens 4, or a combination of those optical elements is shifted or tilted as described above, the imaging point P4 can be displaced.

FIG. 12 is a principal-part cross sectional diagram in the sub-scanning direction (sub-scanning cross sectional diagram), illustrating another embodiment of the optical scanning apparatus according to Embodiment 2 of the present invention.

In FIG. 12, the same components as those illustrated in FIG. 10 are expressed by the same symbols.

FIG. 12 illustrates the case where the distance D' (mm) between the transfer point P2 located between the photosensitive drum 21 and the intermediate transferring belt 103 and the transfer point P1 located between the photosensitive drum 22 and the intermediate transferring belt 103 is set larger than that in the comparative embodiment illustrated in FIG. 10 by two line spaces (L=2 line spaces).

In the same manner, the distance D (mm) between the imaging point P4 of the first line formed by the optical scanning optical system S1 and the imaging point P3 of the first line formed by the optical scanning optical system S2 is set larger than that in the comparative embodiment illustrated in FIG. 10 by two line spaces (L=2 line spaces).

Therefore, it is possible to provide the optical scanning optical systems S1 and S2, in each of which the imaging lens, the mirror, or the like is not shifted or tilted.

Even in this case, the streak-shaped density unevenness caused by the optical scanning optical system S1 and the streak-shaped density unevenness caused by the optical scanning optical system S2 can be displaced with respect to each other by two line spaces in the sub-scanning direction. Therefore, the streak-shaped density unevenness on the entire color image can be made inconspicuous.

Embodiment 3

Figure 13:
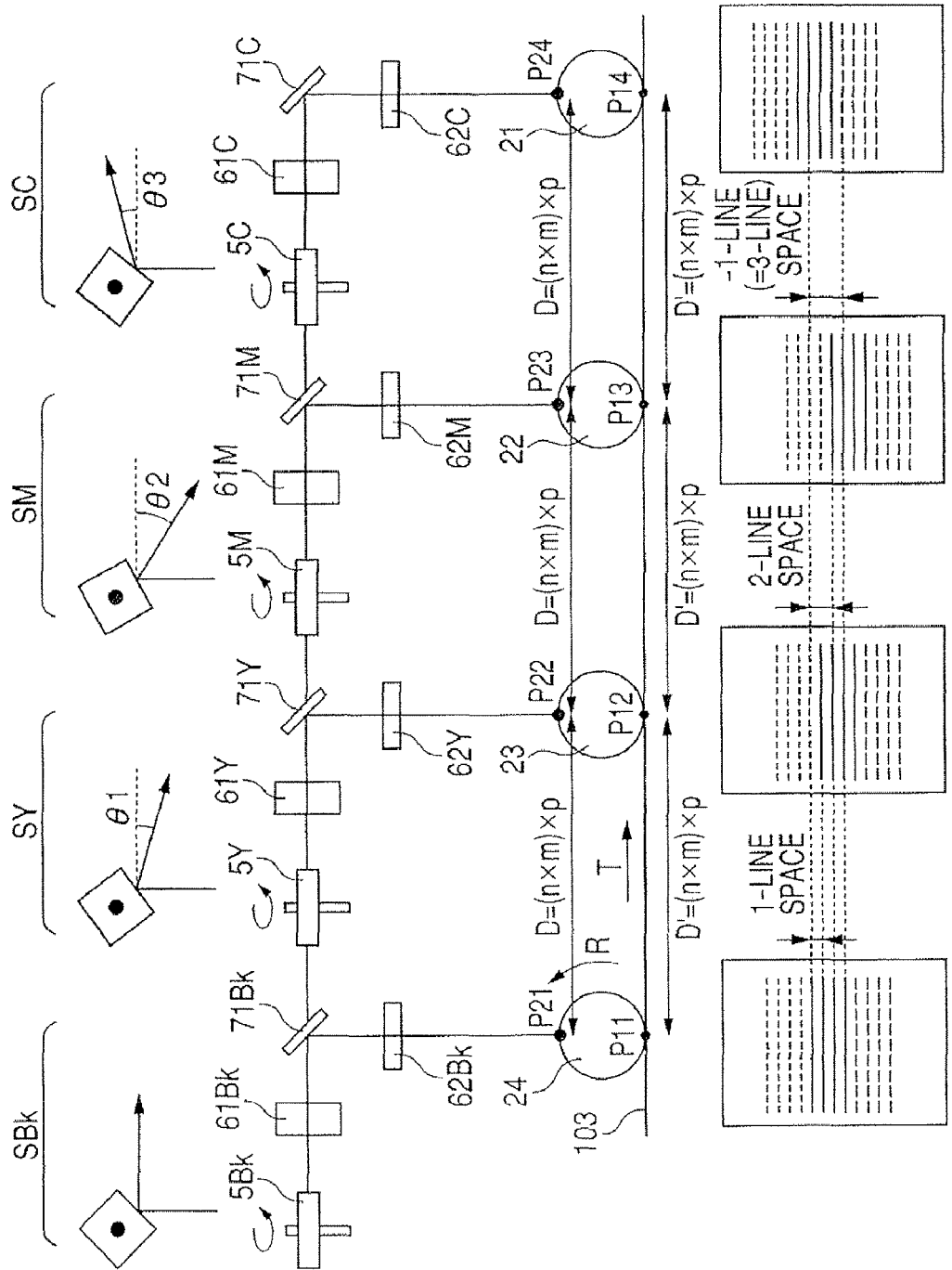
FIG. 13 is a sub-scanning cross sectional diagram illustrating an optical scanning apparatus according to Embodiment 3 of the present invention.

FIG. 13 is a sub-scanning cross sectional diagram illustrating an optical scanning apparatus according to Embodiment 3 of the present invention (including a main scanning cross sectional diagram illustrating an optical deflector).

In FIG. 13, the optical actions of imaging lenses 61Bk and 62Bk (61Y and 62Y; 61M and 62M; 61C and 62C) included in each imaging optical system are identical to the optical actions of the imaging lenses 61 and 62 illustrated in FIG. 9.

This embodiment is different from Embodiment 2 in that deflecting units 5Bk, 5Y, 5M, and 5C are provided for respective optical scanning optical systems SBk, SY, SM, and SC.

In this embodiment, four optical scanning optical systems, that is, the optical scanning optical system SBk for forming a black (Bk) image, the optical scanning optical system SY for forming a yellow (Y) image, the optical scanning optical system SM for forming a magenta (M) image, and the optical scanning optical system SC for forming a cyan (C) image are arranged in parallel. The respective pieces of image data are formed in imaging points P21 to P24 of first lines on the photosensitive drums.

The distance D (mm) between the imaging points is set to satisfy D=(n×m)×p.

The distance D' (mm) among the transfer points P11 to P14 at which respective toner images are transferred onto the intermediate transferring belt 103 is set to satisfy D'=(n×m)×p. This corresponds to the case of the comparative embodiment (see FIG. 10) described in Embodiment 2.

When the deflecting units 5Bk, 5Y, 5M, and 5C are separately provided for the respective optical scanning optical systems SBk, SY, SM, and SC as in this embodiment, the position of the streak-shaped density unevenness can be displaced for each color by a method different from that in Embodiment 2.

For example, assume that a position displaced by an angle θ1 is being scanned by the optical scanning optical system SY while the center of an image is drawn by the optical scanning optical system SBk as illustrated in FIG. 13. When a time necessary to rotate the optical deflector 5Y from that state to a position corresponding to the center of the image is made equal to a time necessary to rotate the photosensitive drum 23 in the sub-scanning direction by one line space, the first line formed by the optical scanning optical system SY and the first line formed by the optical scanning optical system SBk are displaced with respect to each other by one line space in the sub-scanning direction.

In the same manner, a position displaced by an angle θ2 is scanned by the optical scanning optical system SM. A time necessary to rotate the optical deflector 5M from that state to a position corresponding to the center of the image is made equal to a time necessary to rotate the photosensitive drum 22 in the sub-scanning direction by two line spaces. As a result, the first line formed by the optical scanning optical system SM and the first line formed by the optical scanning optical system SBk are displaced with respect to each other by two line spaces in the sub-scanning direction.

Therefore, in the case of the optical scanning apparatus including the separate deflecting units, when deflection phase control is performed on the deflecting units, the first scanning lines can be easily displaced in the sub-scanning direction (rotating direction of the photosensitive drum).

In other words, the deflection phases of the respective deflecting units which are separately controlled are made different from one another, so the first scanning lines can be easily displaced in the sub-scanning direction (rotating direction of the photosensitive drum).

Therefore, a point at which density unevenness occurs for each color can be displaced in the sub-scanning direction. Thus, the streak-shaped density unevenness on the entire color image can be made inconspicuous.

Even in the case where the image data of the first line corresponding to each color is displaced, when the deflection phase is adjusted to be different as in this embodiment, the respective pieces of color image data Yi, Mi, Ci, and Bki produced based on the same original image data can be superimposed on one another in the same position on the intermediate transferring belt.

Even in the case of the optical scanning apparatus including the separate deflecting units as in this embodiment, the imaging lens, the mirror, or the like as described in Embodiment 2 may be shifted or tilted without the deflection phase control. Further, the imaging lens, the mirror, or the like may be shifted or tilted simultaneously with the deflection phase control.

Embodiment 4

Figure 14:
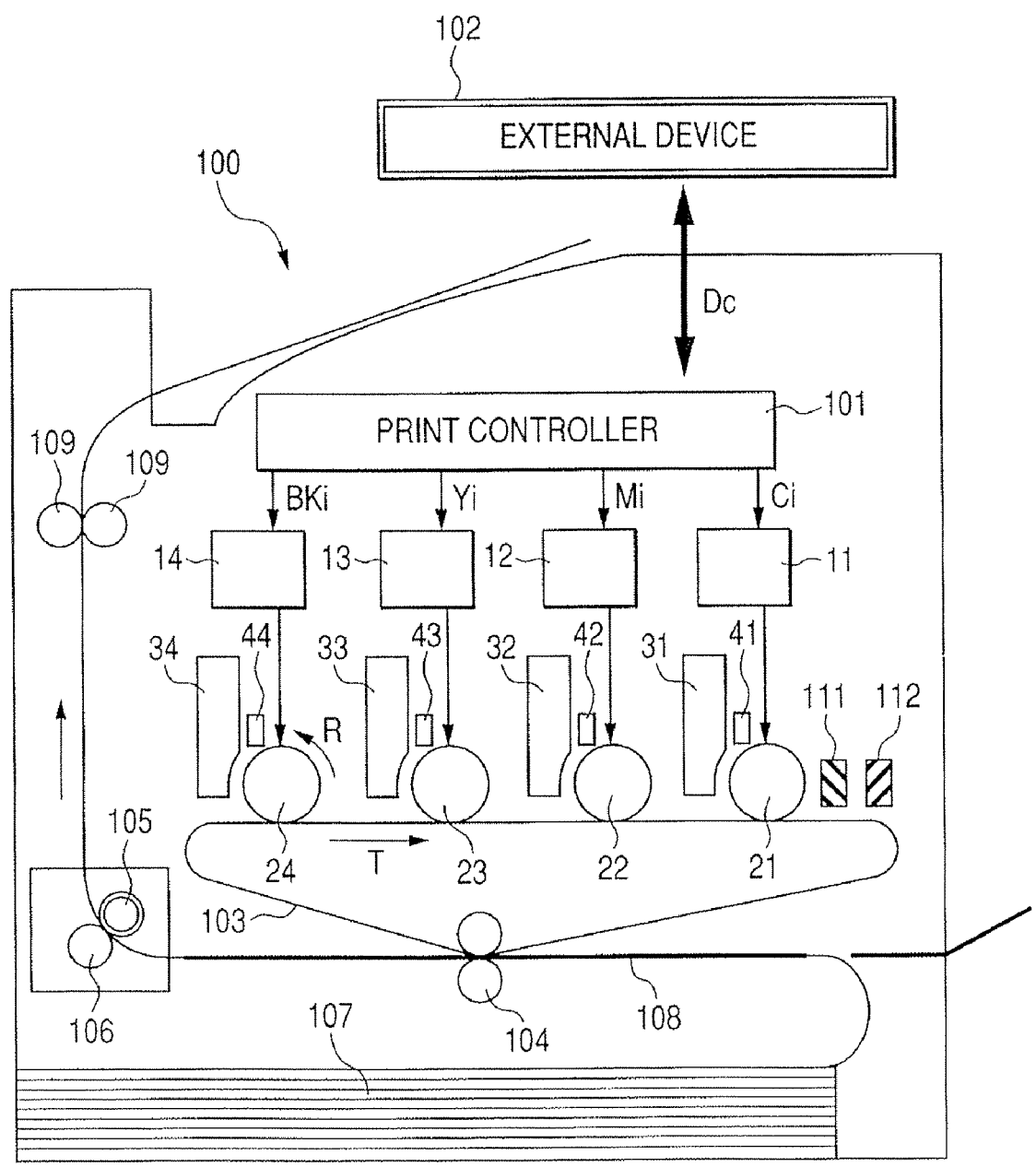
FIG. 14 is a sub-scanning cross sectional diagram illustrating an image forming apparatus according to Embodiment 4 of the present invention.

FIG. 14 is a principal part sectional diagram in the sub-scanning direction (sub-scanning cross sectional diagram), illustrating a color image forming apparatus according to Embodiment 4 of the present invention.

In FIG. 14, code data Do is input from an external device 102 such as a personal computer to an image forming apparatus 100. The code data Dc is converted into respective pieces of color image data of cyan (Ci), magenta (Mi), yellow (Yi), and black (Bki) by a printer controller 101 included in the image forming apparatus. The pieces of color image data are input into scanning optical systems 11 to 14, each of which has the structure described in Embodiment 3. Light beams modulated based on the pieces of image data Ci, Mi, Yi, and Bki are emitted from the optical scanning optical systems 11 to 14. The photosensitive surfaces of the photosensitive drums 21 to 24 are scanned with the light beams in the main scanning direction.

The photosensitive drums 21 to 24 serving as electrostatic latent image bearing members (photosensitive members) are rotated counterclockwise (direction indicated by an arrow R) by motors (not illustrated).

According to the rotation, the photosensitive surfaces of the photosensitive drums 21 to 24 are moved relative to the light beams in the sub-scanning direction orthogonal to the main scanning direction.

Charging rollers (not illustrated) for uniformly charging the surfaces of the photosensitive drums 21 to 24 are provided above the photosensitive drums 21 to 24 so as to be in contact with the surfaces thereof. The surfaces of the photosensitive drums 21 to 24 which are charged by the charging rollers are irradiated and scanned with the light beams by the optical scanning optical systems 11 to 14.

As described earlier, the light beams are modulated based on the pieces of image data Ci, Mi, Yi, and Bki. The surfaces of the photosensitive drums 21 to 24 are irradiated with the light beams to form electrostatic latent images thereon. The electrostatic latent images are developed as toner images by developing devices 31 to 34 provided on the downstream side from the irradiation positions by the light beams in the rotating directions of the photosensitive drums 21 to 24 so as to be in contact with the photosensitive drums 21 to 24.

The toner images developed by the developing devices 31 to 34 are temporarily transferred as four-color toner images onto the intermediate transferring belt 103 provided below the photosensitive drums 21 to 24 so as to oppose the photosensitive drums 21 to 24.

The color toner images formed on the intermediate transferring belt 103 are transferred onto a sheet 108 serving as a material onto which an image is transferred by transfer rollers 104.

The sheet 108 is contained in a sheet cassette 107. Manual feeding is also possible.

The sheet 108 onto which an unfixed toner image is transferred is transported to a fixing device. The fixing device includes a fixing roller 105 having a fixing heater (not illustrated) provided therein and a pressure roller 106 provided to press the fixing roller 105. The sheet 108 transported from the transferring part is heated while it is pressurized by the press-contacting part which is composed of the fixing roller 105 and the pressure roller 106 so that the unfixed toner image on the sheet 108 is fixed. Delivery rollers 109 are provided in the rear of the fixing roller 105 and the sheet 108 to which the image is fixed is delivered to the outside of the image forming apparatus.

Although not illustrated in FIG. 14, the printer controller 101 performs not only data conversion described earlier but also the control of each part of the image forming apparatus and the control of a motor or the like for rotating the polygon mirror included in the optical scanning apparatus.

Electric potential sensors 41 to 44 measure the electric potentials of electrostatic latent images corresponding to a plurality of scanning lines formed on the photosensitive drums 21 to 24. When the electric potentials of the electrostatic latent images are read by the electric potential sensors 41 to 44, the position of streak-shaped density unevenness and the degree thereof in the sub-scanning direction can be measured.

Figure 15:
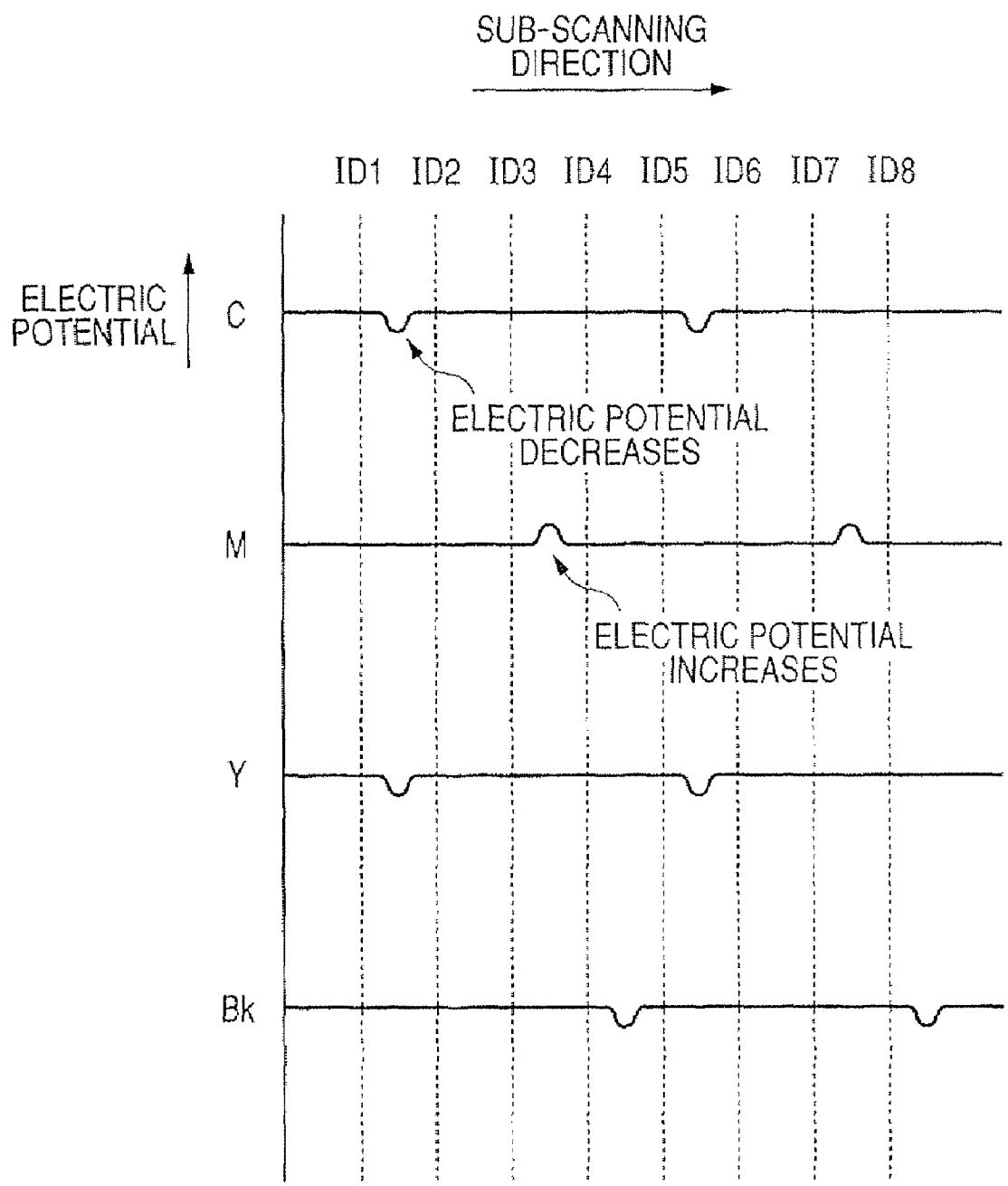
FIG. 15 is a schematic diagram illustrating an electric potential of an electrostatic latent image.

FIG. 15 is a schematic diagram illustrating the electric potentials of the electrostatic latent images on the photosensitive drums 21 to 24 which have been read by the respective electric potential sensors 41 to 44. In FIG. 15, the abscissa indicates a position in the sub-scanning direction and the ordinate indicates an electric potential.

In this embodiment, the four-beam laser is used. Therefore, for example, when an electric potential decreases between pieces of image data ID1 and ID2 in the case of the cyan (C) image, an electric potential also decreases between pieces of image data ID5 and ID6 displaced therefrom by four line spaces.

In the case of the magenta (M) image, an electric potential increases between pieces of image data ID3 and ID4. In the case of the yellow (Y) image, an electric potential decreases between pieces of image data ID1 and ID2 as in the case of the cyan (C) image.

In the case of the black (Bk) image, an electric potential decreases between pieces of image data ID4 and ID5.

Therefore, the electric potentials associated with the four colors are measured. Then, measurement is carried out to determine in which position an electric potential is increased or decreased as compared to peripheral electric potentials. The amount of displacement of each image data is determined based on a result obtained by the measurement.

In this case, a position in which the electric potential changes in the case of the cyan (C) image coincides with that in the case of the yellow (Y) image. Therefore, when a green (G) image is to be formed in this state, the density unevenness is conspicuous.

Thus, for example, the density unevenness can be made inconspicuous by displacing yellow (Y) image data by one line space in the sub-scanning direction. The image data displacing method is the same as that described in Embodiments 1 to 3.

Embodiment 5

Next, Embodiment 5 of the present invention will be described.

The image forming apparatus illustrated in FIG. 14 includes a position sensor 111 for measuring the positions of toner images corresponding to a plurality of scanning lines and a density sensor 112 for measuring the densities of the toner images.

Figure 16:
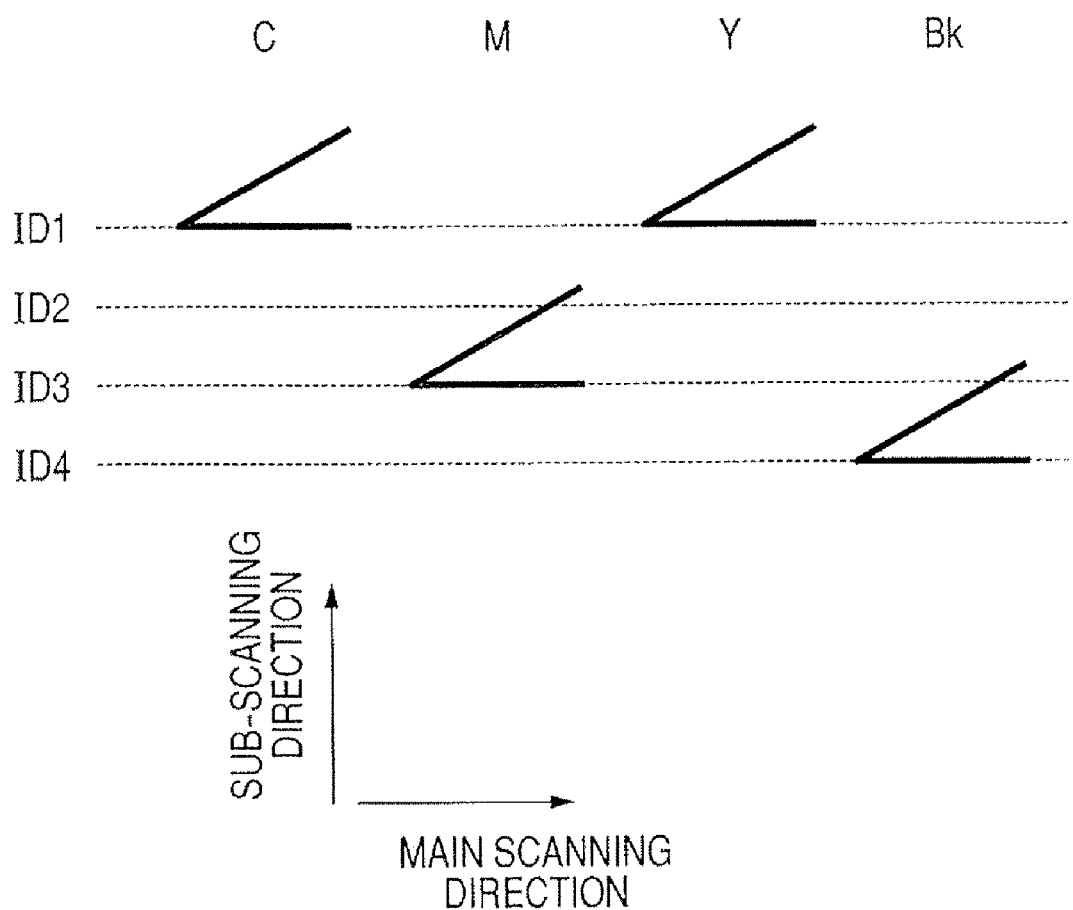
FIG. 16 illustrates registration marks.

The position sensor 111 reads, for example, registration marks as illustrated in FIG. 16. Therefore, a position in the sub-scanning direction at which the first line associated with each of the optical scanning optical systems is imaged can be measured.

In the case illustrated in FIG. 16, the first line in the case of the cyan (C) image is aligned with the first line in the case of the yellow (Y) image. The first line in the case of the magenta (M) image is imaged at a position displaced from the first line in the case of the cyan (C) image by two line spaces. The first line in the case of the black (Bk) image is imaged at a position displaced from the first line in the case of the cyan (C) image by three line spaces. Therefore, even in this case, when the green (G) image is formed, the density unevenness is conspicuous.

Thus, for example, the density unevenness can be made inconspicuous by displacing yellow (Y) image data by one line space in the sub-scanning direction. The image data displacing method is the same as that described in Embodiments 1 to 3.

The density sensor 112 reads the densities of the toner images corresponding to the plurality of scanning lines. The amount of displacement of image data in the optical scanning apparatus is determined based on a result obtained by the reading.

Figure 17:
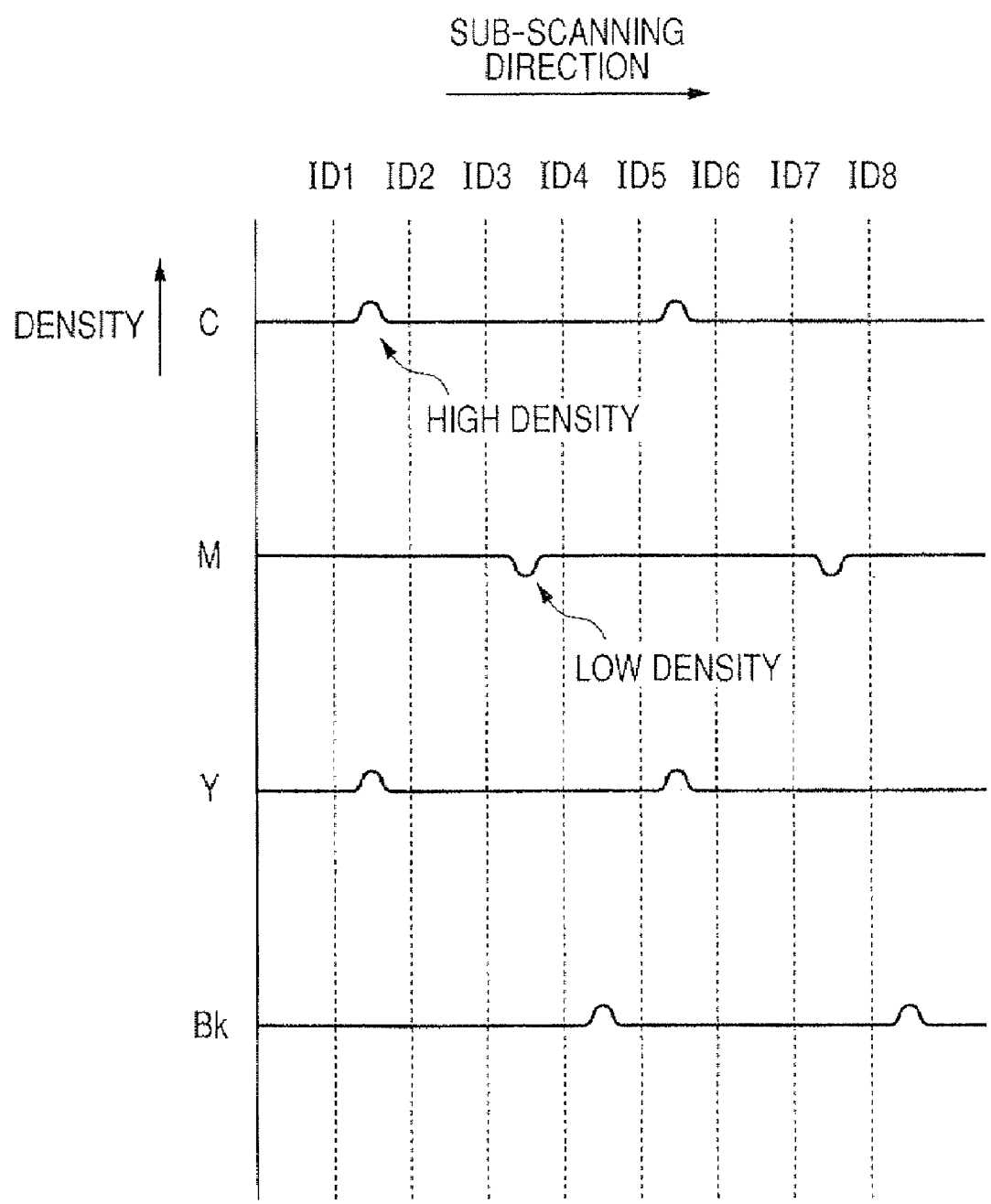
FIG. 17 is a schematic diagram illustrating densities.
Figure 18:
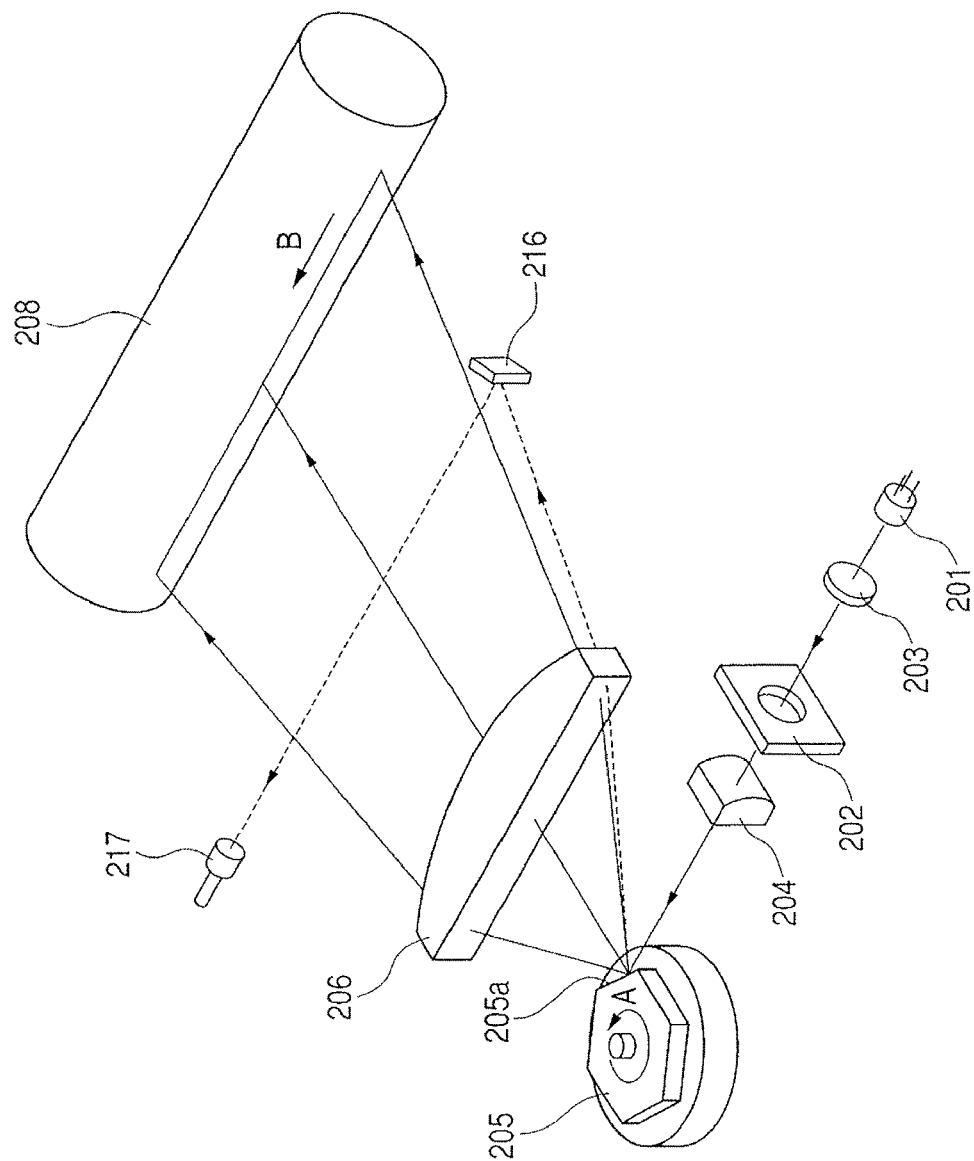
FIG. 18 is a principal-part schematic view illustrating a conventional optical scanning apparatus.
Figure 19:
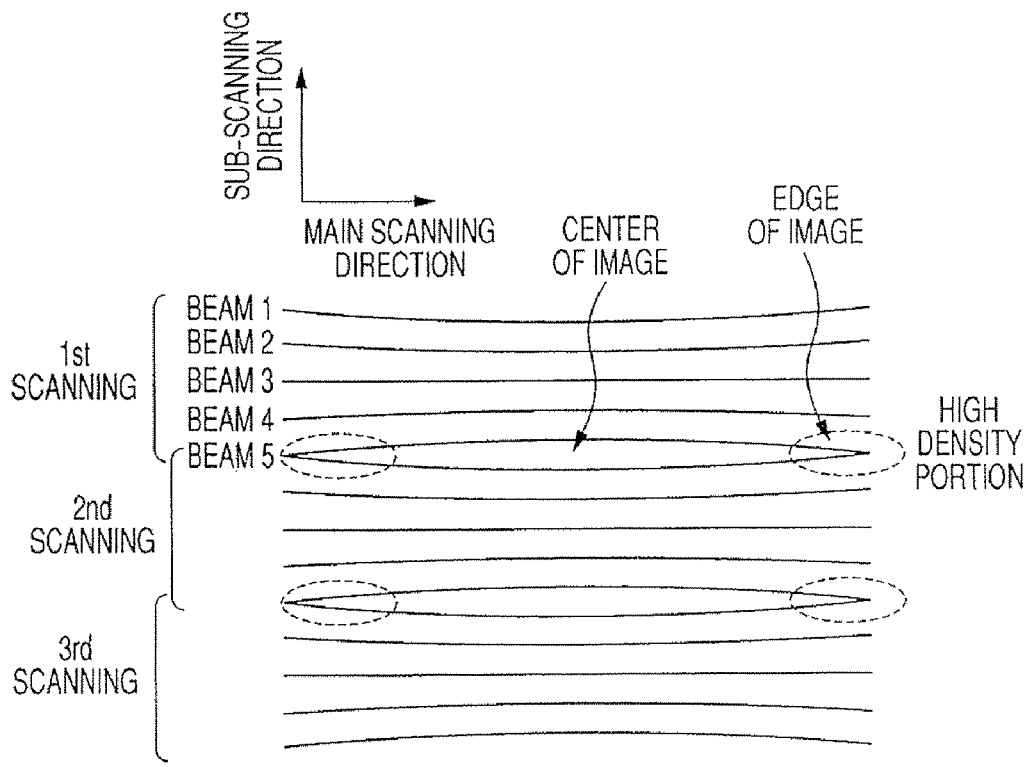
FIG. 19 illustrates an image outputted from a conventional image forming apparatus.
Figure 20:
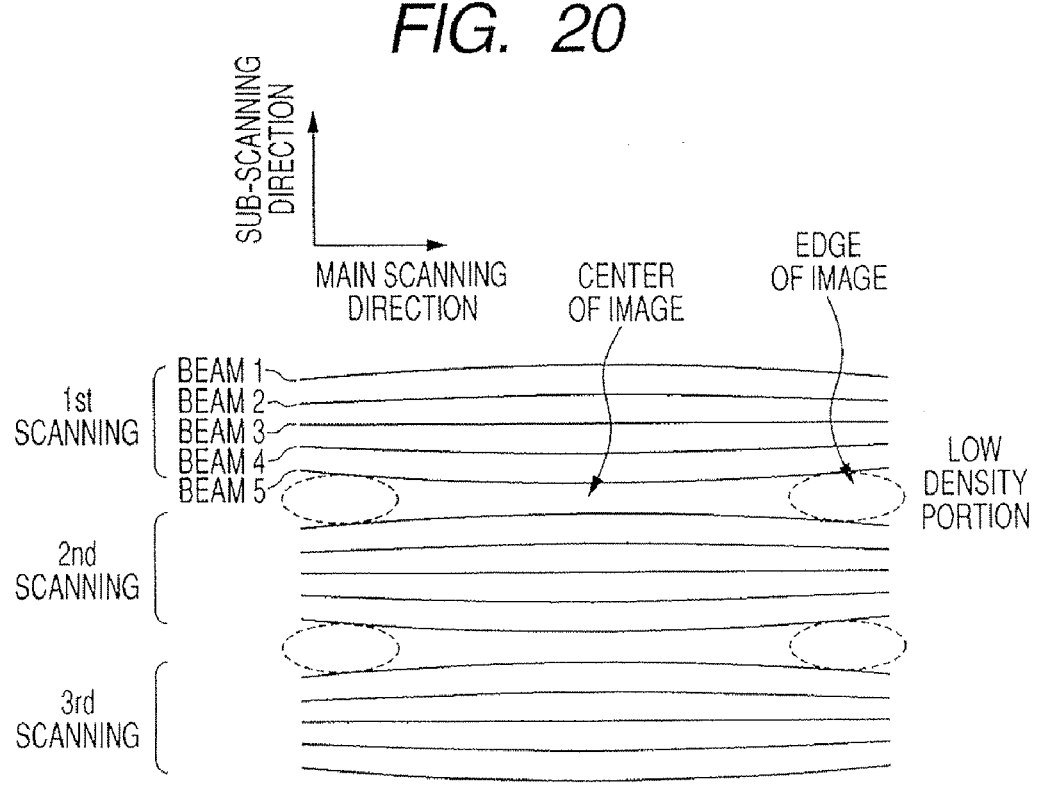
FIG. 20 illustrates another example of an image outputted from the conventional image-forming apparatus.
Figure 21:
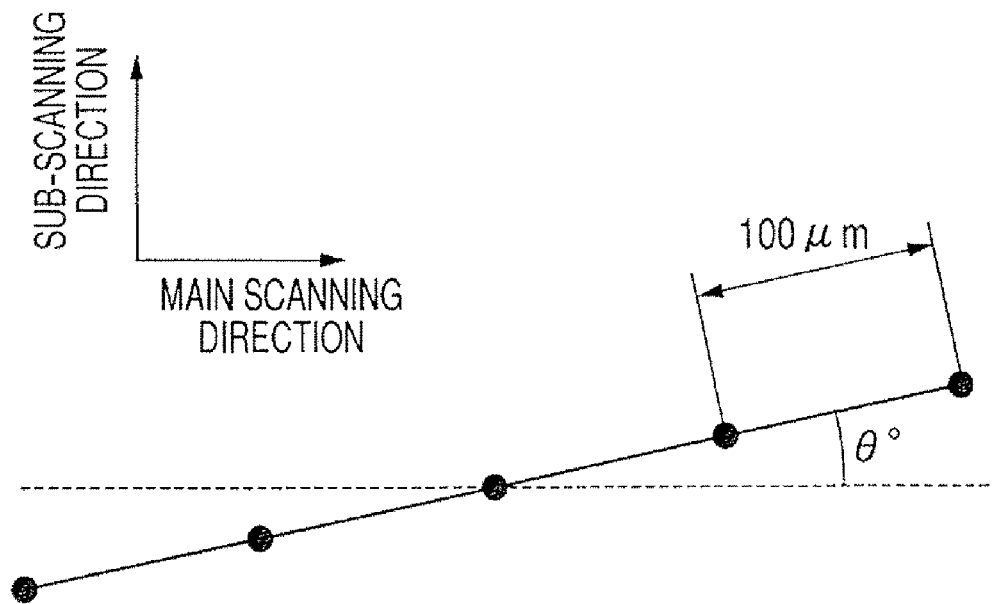
FIG. 21 illustrates a monolithic multi-beam semiconductor laser.
Figure 22:
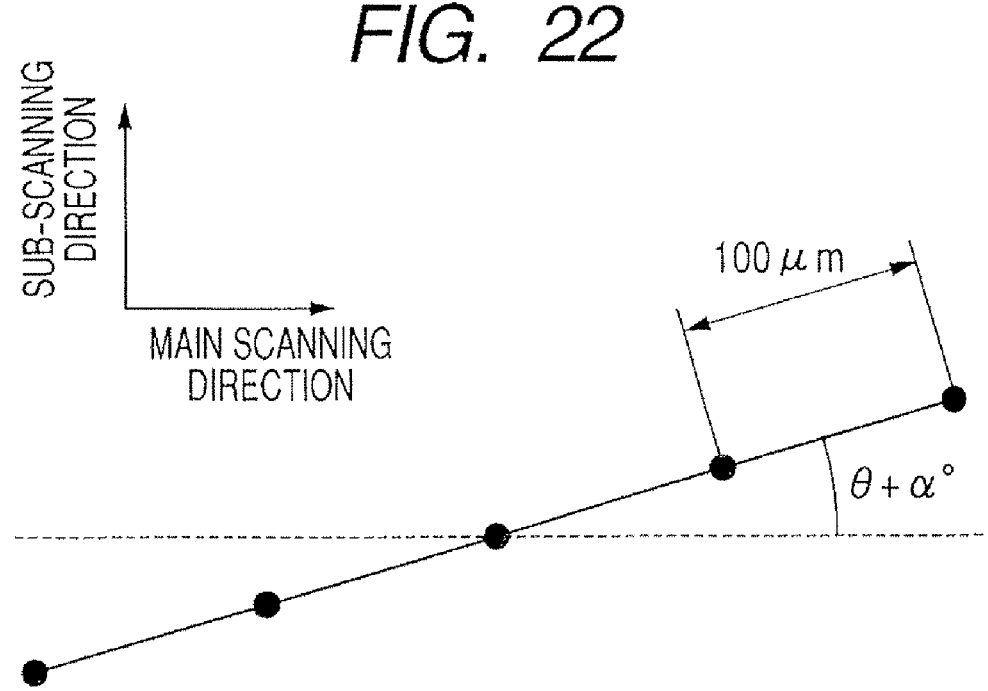
FIG. 22 illustrates another example of the monolithic multi-beam semiconductor laser.

FIG. 17 is a schematic diagram illustrating the densities of the toner images on the intermediate transferring belt 103 which have been read by the density sensor 112. In FIG. 17, the abscissa indicates a position in the sub-scanning direction and the ordinate indicates a density.

In this embodiment, the four-beam laser is used. Therefore, for example, when a density is high between pieces of image data ID1 and ID2 in the case of the cyan (C) image, a density is also high between pieces of image data ID5 and ID6 displaced therefrom by four line spaces.

In the case of the magenta (M) image, a density is low between pieces of image data ID3 and ID4. In the case of the yellow (Y) image, a density is high between pieces of image data ID1 and ID2 as in the case of the cyan (C) image.

In the case of the black (Bk) image, a density is high between pieces of image data ID4 and ID5.

Therefore, the densities associated with the four colors are measured. Then, measurement is carried out to determine in which position the density is higher or lower as compared to peripheral densities. The amount of displacement of each image data is determined based on a result obtained by the measurement. In this case, a position in which the density changes in the case of the cyan (C) image coincides with that in the case of the yellow (Y) image. Therefore, when a green (G) image is to be formed in this state, the density unevenness is conspicuous.

Thus, for example, the density unevenness can be made inconspicuous by displacing yellow (Y) image data by one line space in the sub-scanning direction. The image data displacing method is the same as that described in Embodiments 1 to 3.

The measurement of the imaging position by the position sensor, the measurement of the image density by the density sensor, and the measurement of the electric potential of the electrostatic latent image by the electric potential sensors as described in Embodiment 4 are performed, for example, immediately after the main body of the image forming apparatus is turned on.

Even when a first line on each surface to be scanned is displaced with respect to a first line on another surface to be scanned to make the density unevenness inconspicuous in the case where the image forming apparatus is assembled in a factory, an imaging point may be displaced in the sub-scanning direction by the influence of vibration during transport and the influence of environmental variation.

Therefore, it can be said that a current state is best checked immediately before an image is actually output and image data is displaced such that the density unevenness becomes most inconspicuous.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-039457, filed Feb. 16, 2006, which is hereby incorporated by reference herein in its entirety.

What is claimed is:

1. An optical scanning apparatus, comprising:
a plurality of light source unit, each of which includes four or more light emitting portions for radiating light beams which are optically modulated based on image data;
a deflecting unit for deflecting the plurality of light beams emitted from each of the plurality of light source unit for scanning; and
an imaging optical system for imaging the plurality of light beams which are deflected for scanning by a deflecting surface of the deflecting unit onto a plurality of surfaces to be scanned which are provided for the respective light source unit, in which each of the plurality of surfaces to be scanned is simultaneously scanned with the plurality of light beams emitted from corresponding one of the light source unit and a plurality of scanning lines are simultaneously drawn on each of the plurality of surfaces to be scanned,
wherein the plurality of light beams emitted from the four or more light emitting portions of the corresponding one of the light source unit are simultaneously deflected for scanning by the deflecting surface of the deflecting unit, and
wherein, when a first scanning line on the surfaces to be scanned is defined as a scanning line located on an uppermost stream side in a direction in which corresponding one of the surfaces to be scanned is moved, of a plurality of scanning lines formed by the plurality of light beams emitted from the four or more light emitting portions of the corresponding one of the light source unit, image data corresponding to a first scanning line on at least one of the plurality of surfaces to be scanned in a k-th scanning operation of the deflecting unit is displaced by at least one line space from image data corresponding to a first scanning line on another one of the plurality of surfaces to be scanned in the k-th scanning operation of the deflecting unit,
wherein in the k-th scanning operation of the deflecting unit, pieces of image data corresponding to first scanning lines on the surfaces to be scanned are displaced by at least one line space from one another,
wherein a number of light emitting portions "n1" of a light source unit which is provided corresponding to at least one of the plurality of surfaces to be scanned is different from the minimum number of light emitting portions "n2" of at least another one of the light source units which is provided corresponding to another one of the plurality of surfaces to be scanned, and
wherein $n1 = n2 \times a$ and "a" is a positive integer.

2. An optical scanning apparatus according to claim 1, wherein the following equation is satisfied, $$D = (n \times m + L) \times p$$

where D (mm) represents a distance between imaging points of first lines on adjacent two of the plurality of surfaces to be scanned, p (mm) represents a scanning line interval determined from a resolution of the optical scanning apparatus, n indicates the number of light emitting portions of the light source unit, m indicates a positive integer, and L indicates an integer satisfying $1 \leq L \leq n-1$.

3. An optical scanning apparatus according to claim 2,
wherein the optical scanning apparatus comprises a plurality of the imaging optical systems,
wherein each of the plurality of imaging optical systems includes an imaging optical element, and
wherein the imaging optical elements included in the plurality of imaging optical systems are different from one another in shift amounts in a sub-scanning direction relative to optical axes of the imaging optical systems.

4. An optical scanning apparatus according to claim 2, further comprising a plurality of optical systems,
wherein each of the plurality of imaging optical systems includes an optical element, and
wherein the imaging optical elements included in the plurality of imaging optical systems are different from one another in tilt amounts having a rotating axis parallel to a main scanning direction.

5. An optical scanning apparatus according to claim 1,
wherein the optical scanning apparatus comprises a plurality of the deflecting units and
wherein the plurality of deflecting units is different from one another in deflection phases in the k-th scanning operation of the deflecting unit.

6. An optical scanning apparatus according to claim 1, wherein the light source unit comprises a vertical-cavity surface-emitting laser including a plurality of light emitting portions.

7. An optical scanning apparatus according to claim 6, wherein the light source unit comprises the vertical-cavity surface-emitting laser including the plurality of light emitting portions which are two-dimensionally arranged.

8. A color image forming apparatus, comprising:
the optical scanning apparatus according to claim 1;
a plurality of photosensitive members located on the surfaces to be scanned;
a plurality of developing devices for developing, as toner images, electrostatic latent images formed on the photosensitive members scanned with the light beams by the optical scanning apparatus;
a transferring device for transferring the developed toner images to a material onto which an image is to be transferred; and
a fixing device for fixing the transferred toner images to the material onto which an image is to be transferred.

9. A color image forming apparatus according to claim 8, further comprising an electric potential sensor for measuring electric potentials of the electrostatic latent images formed on the photosensitive members, wherein information of the electrostatic latent images corresponding to the plurality of scanning lines is read by the electric potential sensor and a displacement amount of image data in the optical scanning apparatus is determined based on a result obtained by the reading.

10. A color image forming apparatus according to claim 8, further comprising a position sensor for measuring positions of the developed toner images, wherein positional information of the plurality of scanning lines is read by the position sensor and a displacement amount of image data in the optical scanning apparatus is determined based on a result obtained by the reading.

11. A color image forming apparatus according to claim 8, further comprising a density sensor for measuring densities of the developed toner images corresponding to the plurality of scanning lines, wherein densities of the toner images are read by the density sensor and a displacement amount of image data in the optical scanning apparatus is determined based on a result obtained by the reading.

12. A color image forming apparatus, comprising:
the optical scanning apparatus according to claim 1; and
a printer controller for converting code data input from an external device into an image signal, and inputting the image signal to the optical scanning apparatus.

* * * * *